United States Patent
Hershey et al.

(10) Patent No.: US 9,726,460 B2
(45) Date of Patent: Aug. 8, 2017

(54) SYSTEM AND METHOD FOR ASYMMETRIC MISSILE DEFENSE

(71) Applicant: Raytheon Company, Waltham, MA (US)

(72) Inventors: Paul C. Hershey, Ashburn, VA (US); Robert E. Dehnert, Jr., Dulles, VA (US); John J. Williams, Dulles, VA (US); David J. Wisniewski, State College, PA (US)

(73) Assignee: Raytheon Company, Waltham, MA (US)

( * ) Notice: Subject to any disclaimer, the term of this patent is extended or adjusted under 35 U.S.C. 154(b) by 386 days.

(21) Appl. No.: 14/600,920

(22) Filed: Jan. 20, 2015

(65) Prior Publication Data

US 2016/0253590 A1    Sep. 1, 2016

Related U.S. Application Data

(60) Provisional application No. 61/929,252, filed on Jan. 20, 2014.

(51) Int. Cl.
*G06N 5/04* (2006.01)
*F41H 11/00* (2006.01)

(52) U.S. Cl.
CPC ............ *F41H 11/00* (2013.01); *G06N 5/04* (2013.01)

(58) Field of Classification Search
None
See application file for complete search history.

(56) References Cited

U.S. PATENT DOCUMENTS

2014/0279809 A1    9/2014   Hershey et al.
2015/0205760 A1    7/2015   Hershey et al.

OTHER PUBLICATIONS

Maybury, Distributed, Collaborative, Knowledge Based Air Campaign Planning, NATO/AGARD Lecture Series 200 on Knowledge-Based Functions in Aerospace Mission Systems, 1995, pp. 2-1 to 2-13.*

Kopp, Carlo, "High Energy Laser Directed Energy Weapons Technical Report, APA-TR-2008-0501", May 2008, Defense Today, 2006 series, Updated Apr. 2012, Copyright 2006-2012 Carlo Kopp.

(Continued)

*Primary Examiner* — Wilbert L Starks
(74) *Attorney, Agent, or Firm* — Renner, Otto, Boisselle & Sklar, LLP

(57) ABSTRACT

A method for accurately determining whether a response tool will be effective for responding to a given enemy threat object. Embodiments described herein provide a method and system for responding to a threat object, for example, negating missile threats. Embodiments may include validating effectiveness of a response to the threat object. Other embodiments may include verifying the continued effectiveness of a response to the threat object. Further embodiments may include providing feedback to re-perform the method for responding to the threat object. The system may include a mathematical method, and associated algorithms, to assess, in an automated fashion, the performance of non-kinetic techniques with respect to negating the threat object.

20 Claims, 12 Drawing Sheets

(56) References Cited

OTHER PUBLICATIONS

Shein, Rob, "A Brief Summary of Cyber Warfare," Information Security Management Handbook, Sixth Edition, vol. 4, edited by Harold F. Tipton and Micki Krause Nozaki, Auerbach Publications, 2010. Copyright 2011-2013 Auerbach Publications.
Defense Science Board, "Task Force Report: Resilient Military Systems and the Advanced Cyber Threat," Jan. 2013, Office of the Under Secretary of Defense for Acquisition, Technology, and Logistics, Washington, D.C.
Missile Defense Agency, "Ballistic Missile Defense Program Overview for The National Defense Industrial Association", May 8, 2008, 08-MDA-3495.
Hershey, P. et al., "A Policy-based Approach to Automated Data Reduction for Intelligence, Surveillance, and Reconnaissance Systems," Copyright 2013, IEEE.
Claims for Hershey, P. et al., "Mathematical Method for Non-kinetic Performance Assessment (M2NPA)," filed Feb. 20, 2014, U.S. Appl. No. 14/185,029.
Wortzel, L., "China's Military Modernization and Cyber Activities," Spring 2014, Strategic Studies Quarterly, vol. 8, No. 1, ISSN 1936-1815, pp. 3-22.
Weiner, S. et al., "Discrimination Performance Requirements for Ballistic Missile Defense," vol. 7, No. 1, 1994, The Lincoln Laboratory Journal, pp. 63-88.
Wilkening, D., "A Simple Model for Calculating Ballistic Missile Defense Effectiveness," Science and Global Security, 1999, vol. 8.2, pp. 183-215.
Peterson, Joshua J., "Appropriate Factors to Consider when Assessing Analytic Confidence in Intelligence Analysis," 2008, Erie, PA: Mercyhurst College.
U.S. Army, "Human Intelligence Collector Operations", Sep. 2006, Field Manual, 202203, Washington, DC: Department of Army.
Robertson, Matthew, "Chinese 'Carrier Killer' Based on US Technology", The Epoch Times. [Online] Jun. 28, 2011, [Cited: Feb. 15, 2013] http://www.theepochtimes.com/n2/china-news/chinese-carrier-killer-based-on-us-technology-57974.html.
"ExtendSim 9 Reference," accessed Nov. 8, 2013, Copyright © 2013 by Imagine That Inc., https://www.extendsim.com/downloads/forms/install_instrucs/ExtendSim%209%20Reference.pdf.
Ishikawa, K. (1968), Guide to Quality Control (Japanese): Gemba No QC Shuho, Tokyo: JUSE Press, Ltd. (check).
Ishikawa, K. (1990), Introduction to Quality Control. (Translation).
Jousselme, Anne-Laure, Dr., "Fusion challenges for target identification under uncertainty," Dec. 2013, DRDC-Valcartier, Command, Control and Intelligence section, RCAF Avionics and Systems Workshop, Ottawa, Canada.
Klir et al., "Uncertainty and Information, Foundations of Generalized Information Theory," Binghamton University-SUNY, Wiley Interscience, Copyright 2006 by John Wiley & Sons, Inc.
Ristic, B. et al., "Target Classification Approach Based on the Belief Function Theory," Apr. 2005, IEEE Trans. on Aerospace and Electronic Systems, vol. 4, No. 2.
Technical Characteristics of the NATO Identification System (NIS), Feb. 11, 2009, NATO STANAG 4162—ED 2.
NATO Standard Identity Description Structure for Tactical Use, (2005), STANAG 1241 Ed. 5.
Nato Industrial Advisory Group (NIAG), Update for NDIA International Division, Jul. 10, 2013.
Claims for Hershey, P. et al., "Digital Weapons Factory and Digital Operations Center for Producing, Deploying, Assessing, and Managing Digital Defects," patent filed Jan. 20, 2014, U.S. Appl. No. 61/929,247, U.S. Appl. No. 14/600,880.

* cited by examiner

FIG. 5

Computational Level 1: Basic Factors Level 521 – $P_n$ for each Vulnerability and Technique (VT) Pair is calculated (Initial Data Input Level)

Math Tool 4 Computation Levels 570

$P_n(VT) = P_e \times P_d$

| | | Vulnerability 510 530 | | Technique 540 560 | | Levels 590 |
|---|---|---|---|---|---|---|
| | | P(e) | P(sv) 531 | P(p) 551 | P(d) 561 P(a) | |
| 520 | P(su) | | Destroy 532 | Very Achievable | Very Achievable | 0.9 |
| 522 | Very Unlikely | | | | | |
| | Likely | | Disrupt 533 | Achievable 553 | Achievable 563 | 0.7 |
| | Neutral | | Deny | Neutral 552 | Neutral 562 | 0.5 |
| 523 | Unlikely | | Degrade (Deter) 534 | Likely Unachievable 554 | Likely Unachievable 564 | 0.3 |
| 524 | Very Unlikely | | Deceive 535 | Very Likely Unachievable 555 | Very Likely Unachievable 565 | 0.1 |

Computation Level 1

Basic Factors Level (Initial Data Input Level for $P_n(VT)$)
For each Vul./Technique Intersection (VT), $P_n$ (Probability of negation ) is calculated by multiplying $P_e$ (Probability of effectiveness) - where $P_e$ is a combination of vul. $P_{su}$ (Probability of success) & $P_{sv}$ (Probability of severity) - & $P_d$ (Probability of deployment ) - where $P_d$ is a combination of techniques $P_p$ (Probability of placement) & $P_a$ (Probability of activation) - for that VT. The values of $P_d$ & $P_e$ are determined by combination of actual data & of information from Subject Matter Experts via rule-based value derivation process (e.g. (FMEA)).

500

580

| Threat #1 | | Manufacturing | | | Facility | | | Deployment Vehicle | | | Maintenance | | | Launch | | | | C2 SCADA | | Uplink | | In Flight Guidance | | Vehicle |
|---|---|---|---|---|---|---|---|---|---|---|---|---|---|---|---|---|---|---|---|---|---|---|---|---|
| | | | | | | | | | | | Tools | | Personnel | Comms | | | | | | | | | | |
| | | Vuln A | Vuln B | Vuln C | Vuln D | Vuln E | Vuln F | Vuln G | Vuln H | Vuln I | Vuln J | Vuln K | Vuln L | Vuln M | Vuln N | Vuln O | Vuln P | Vuln Q | Vuln R | Vuln S | Vuln T | Vuln U | Vuln V | Vuln W |
| Non-Kinetic (Cyber Effects) | Technique 1 | 0.9 | | 0.9 | | | | 0.3 | | | | | 0.7 | | 0.4 | 0.5 | | | | 0.9 | | | | |
| | Technique 2 | 0.6 | 0.6 | | | 0.7 | 0.7 | 0.7 | | 0.4 | | 0.1 | 0.8 | | | | | 0.6 | 0.2 | | | 0.5 | 0.8 | 0.5 |
| | Technique 3 | 0.2 | | 0.3 | 0.2 | 0.6 | 0.1 | | | | | | | | | | | | | | | | | |
| | Technique n | | | 0.2 | | | | | | | | | | | | | | | | | | | | |
| Directed Energy | EMP Technique 1 | | | | 0.3 | | | | | | | | | | 0.8 | | | | | 0.7 | 0.5 | 0.6 | | |
| | EMP Technique 2 | | | | | | | | | | | | | | | | | | | 0.8 | 0.7 | | 0.7 | |
| | Micro Wave 1 | | | | | | | | | | | | | | | | | | | | 0.4 | | | |
| | Micro Wave 2 | | | | | | | | | | | | | | | 0.6 | 0.5 | | | | 0.7 | | | |
| | DE Technique n | | | | | | | | | | | | | | | | | | | | | | | |
| Kinetic | Weapon A (JDAM) | 0.7 | | | 0.6 | | | 0.9 | 0.9 | | | | | | | | | | | | | | | |
| | Weapon B (Interceptor) | | | | | | | | | | | | | | | | | | | | | | | 0.9 |
| | Technique Count | 3 | 1 | 3 | 2 | 2 | 2 | 2 | 1 | 1 | 0 | 1 | 2 | 0 | 2 | 1 | 1 | 1 | 1 | 3 | 4 | 2 | 2 | 1 |

FIG. 13

SYSTEM AND METHOD FOR ASYMMETRIC MISSILE DEFENSE

RELATED APPLICATIONS

This application claims the benefit of U.S. Provisional Application No. 61/929,252 filed Jan. 20, 2014, which is hereby incorporated herein by reference in its entirety.

Also, this application is related to two commonly-assigned concurrently-filed applications, "Integrated Digital Weapons Factory and Digital Operations Center for Producing, Deploying, Assessing, and Managing Digital Defects", which is hereby incorporated herein by reference in its entirety; and "Process of Probabilistic Multi-Source Multi-INT Fusion Benefit Analysis", which is hereby incorporated herein by reference in its entirety.

BACKGROUND

Continued proliferation of long range missiles and the fielding of sophisticated threats, such as the maneuvering re-entry vehicle, pose challenges for the fielded Ballistic Missile Defense System (BMDS) weapon systems. However, as missile defense has evolved from World War II to the present day, the advent of the digital age and the emergence of a wide variety of non-kinetic techniques create Asymmetric opportunities to augment the BMDS to assist in negation of ballistic missile threats and to rapidly inject intelligence surveillance and reconnaissance (ISR) actionable decision aids into the often stressful offensive and defensive battle operations.

Kinetic techniques involve projectile weapons (e.g., such as guns, missiles and bombs) that destroy targets by kinetic effects (e.g., overpressure, projectile, shrapnel and spalling damage, and incendiary effects). Kinetic weapons may use stored chemical energy in propellants and warhead explosives and deliver this energy to a target by means of a projectile of some kind.

Non-kinetic techniques involve digital and electronic weapons that generally do not induce direct physical harm to people. Examples: cyber, electronic warfare (EW), and decoys. Cyber weapons are delivered digitally and attack target systems via computer software. Electronic warfare weapons attack systems via signals and energy. They include: Direct Energy (DE) weapons that deliver a large amount of stored energy from the weapon to the target, to produce structural and incendiary damage effects; high-power microwave signals, charge particle beams, and high energy lasers. Decoys are defense measures that direct the enemy threat safely away from the primary target.

Between the years 2010 and 2012, over 50 trans-Atlantic companies participated in the North Atlantic Treaty Organization (NATO) Industry Advisory Group (NIAG) missile defense study. The purpose of the study was to identify anticipated missile defense capabilities from 2020 to 2030. In other words, the focus of the NATO study is a continuation of kinetic solutions which already struggle with raid size and sophistication. In effect, what the 50 trans-Atlantic NATO companies are saying is the best that industry can offer their democracies through 2030 is to wait for the threats to launch before acting.

Currently, there are analytical solutions to provide performance assessment of the kinetic solutions. For example, Probability of Single Shot Engagement Kill, PSSEK, which is a measure the effectiveness that is used in these analytical approaches, is derived considering only kinetic means to neutralize the ballistic missile threat. PSSEK factors in the reliability of the combat system, the reliability of the interceptor, and the ability of the interceptor to intercept the Re-entry Vehicle (RV) of the missile. PSSEK expresses the reliability of the combat system operating correctly, and the probability of the interceptor neutralizing the threat.

In addition to probabilistic approach to characterizing PSSEK, there have been scoring systems developed to assess vulnerabilities of kinetic weapons (e.g. missiles). These systems prioritize vulnerabilities and identify those that pose the greatest risk. One such scoring system is the Common Vulnerability Scoring System (CVSS) that provides an open framework within which to score vulnerabilities. CVSS provides standardized vulnerability scores. When an organization normalizes vulnerability scores across its software and hardware platforms, it can leverage a vulnerability management policy. This policy may be similar to a service level agreement (SLA) that states how quickly a particular vulnerability must be validated and remediated.

However, the current methods cannot reliably provide probability distributions, let alone provide probability distributions in a real-time manner.

SUMMARY OF INVENTION

The present invention provides a method for accurately determining whether a response tool will be effective for responding to a given enemy threat object.

Embodiments described herein provide a method and system for responding to a threat object, for example, negating missile threats. Embodiments may include validating effectiveness of a response to the threat object. Other embodiments may include verifying the continued effectiveness of a response to the threat object. Further embodiments may include providing feedback to re-perform the method for responding to the threat object. The system may include a mathematical method, and associated algorithms, to assess, in an automated fashion, the performance of non-kinetic techniques with respect to negating the threat object.

A method for non-kinetic performance assessment is realized, as exemplified in U.S. application Ser. No. 14/185,029 filed Feb. 20, 2014, which is hereby incorporated herein by reference in its entirety. The method may be within a layered asymmetric missile defense (AMD) system integrating cyber (offense and defense) technologies, ISR asset knowledge, processing exploitation and dissemination (PED) techniques, legacy and emerging advanced analytics, as well as, electronic warfare (EW) capabilities. Other proven techniques, such as decoys and battle management (kinetic and non-kinetic) capabilities capable of negating missile threats (not only in phases of flight, but also left of launch) may also be incorporated within the system. Moreover, embodiments described herein may be used to assess system of systems performances and operable states of the system of systems, and the likelihood that each state and corresponding performance translates performance into understandable metrics, such as raid negation.

An aspect of the invention includes a data broker reasoner configured to constantly derive probabilities of successfully negating a threat based on historical data.

Another aspect of the invention includes a decision engine in communication with one or more simulators and/or one or more data processes to determine a probability of defending against an enemy threat.

According to one aspect of the invention, a method of responding to a threat object, the method comprising a method for selecting a response tool comprising detecting with a sensor a phase and an identification of a threat object based on a detected portion of the threat object and/or a second object operatively connectable with the portion of the threat object, determining a model of a lifecycle of the threat object based on the detected portion and/or the second object, searching for a first set of vulnerabilities of the modeled lifecycle, choosing a first response tool to impair the performance of the threat object and the detected portion of the threat object and/or the second object, and storing the identification of the threat object, the model of the lifecycle, and the first response tool, a method for iteratively selecting a response tool during a first phase comprising performing the method for selecting the response tool, and updating the identification of the threat object, the modeled lifecycle, the first set of vulnerabilities, and the first response tool based on the modeled lifecycle, vulnerabilities, the first response tool, and the first phase, and a method for iteratively selecting a response tool during a second phase comprising detecting with the sensor a second phase, performing the method for selecting the response tool, and updating the identification of the threat object, the modeled lifecycle, the first set of vulnerabilities, and the first response tool based on the modeled lifecycle, vulnerabilities, the first response tool, and the second phase, and implementing the first response tool against the threat object and/or the second object. Any of the above aspects may include any of the below features individually or in combination.

The method of responding to a threat object of claim may comprise validating that the implemented first response tool deployed against the threat object and/or the second object.

The method of responding to a threat object may comprise verifying that the validated first response tool mitigated the threat object and/or the second object.

The method of responding to a threat object may be repeated to update the stored identification of the threat object, the model of the lifecycle, and/or the first response tool, in response to identifying less than a first amount of vulnerabilities during the searching for a first set of vulnerabilities step.

The first amount may be one.

The method of responding to a threat object may comprise searching for a first set of viable response tools for implementing against one or more of the vulnerabilities of the first set of vulnerabilities.

The method of responding to a threat object may be repeated to update stored identification of the threat object, the model of the lifecycle, and/or the first response tool, in response to identifying less than a first amount of viable response tools during the searching for a first set of viable response tools step.

The first response tool may be chosen from a plurality of response tools provided in a database.

The choosing a first response tool step may comprise choosing plurality of response tools.

The method of responding to a threat object may be repeated to update the stored identification of the threat object, the model of the lifecycle, and/or the first response tool, in response to determining that the first response tool was not implemented.

The method of responding to a threat object may be repeated to update the stored identification of the threat object, the model of the lifecycle, and/or the first response tool, in response to determining that the first response tool was mitigated.

The threat object may include a kinetic weapon.

The threat object may include a plurality of kinetic weapons.

The threat object may include a vehicle.

The first response tool may include a non-kinetic response tool.

The first response tool may include a plurality of tools.

The first response tool may include a kinetic tool.

The method of responding to a threat object may comprise determining a number of kinetic response tools that are required to negate the threat object based on an effectiveness of the first response tool.

According to another aspect of the invention, a system for responding to a threat object, the system comprising a selector module for selecting a response tool, comprising a detection module with a sensor for detecting a phase and an identification of a threat object based on a detected portion of the threat object and/or a second object operatively connectable with the portion of the threat object, a determination module for determining a model of a lifecycle of the threat object based on the detected portion and/or the second object, a search module for searching a first set of vulnerabilities of the modeled lifecycle, a choice module for choosing a first response tool to impair the performance of the threat object and the detected portion of the threat object and/or the second object, and a storage module for storing the identification of the threat object, the model of the lifecycle, and the first response tool, an iterative selection module for iteratively selecting a response tool during a first phase comprising a feedback loop for communication with the selector module for selecting the response tool, and an update module for updating in the storage module the identification of the threat object, the modeled lifecycle, the first set of vulnerabilities, and the first response tool based on the modeled lifecycle, vulnerabilities, the first response tool, and the first phase, and an iterative selection module for iteratively selecting a response tool during a second phase comprising a detection module for detecting with the sensor a second phase, a feedback loop for communication with the selector module for selecting the response tool, and an update module for updating in the storage module the identification of the threat object, the modeled lifecycle, the first set of vulnerabilities, and the first response tool based on the modeled lifecycle, vulnerabilities, the first response tool, and the second phase, and an implementation module for implementing the first response tool against the threat object and/or the second object. The above aspect may include any of the above features individually or in combination.

The foregoing and other features of the invention are hereinafter described in greater detail with reference to the accompanying drawings.

BRIEF DESCRIPTION OF THE DRAWINGS

FIG. 5 is a portion of a math tool including a scoring system for the probability of effectiveness, Pe, and the probability of deployment, Pd, according to an embodiment.

FIG. 13 is an exemplary portion of the math tool of FIG. 5.

DETAILED DESCRIPTION

The principles of this present application have particular application to military defense, and thus will be described below chiefly in this context. It will of course be appreciated, and also understood, that principles of this invention may be applicable to other defensive and/or offensive applications.

Figure 1:
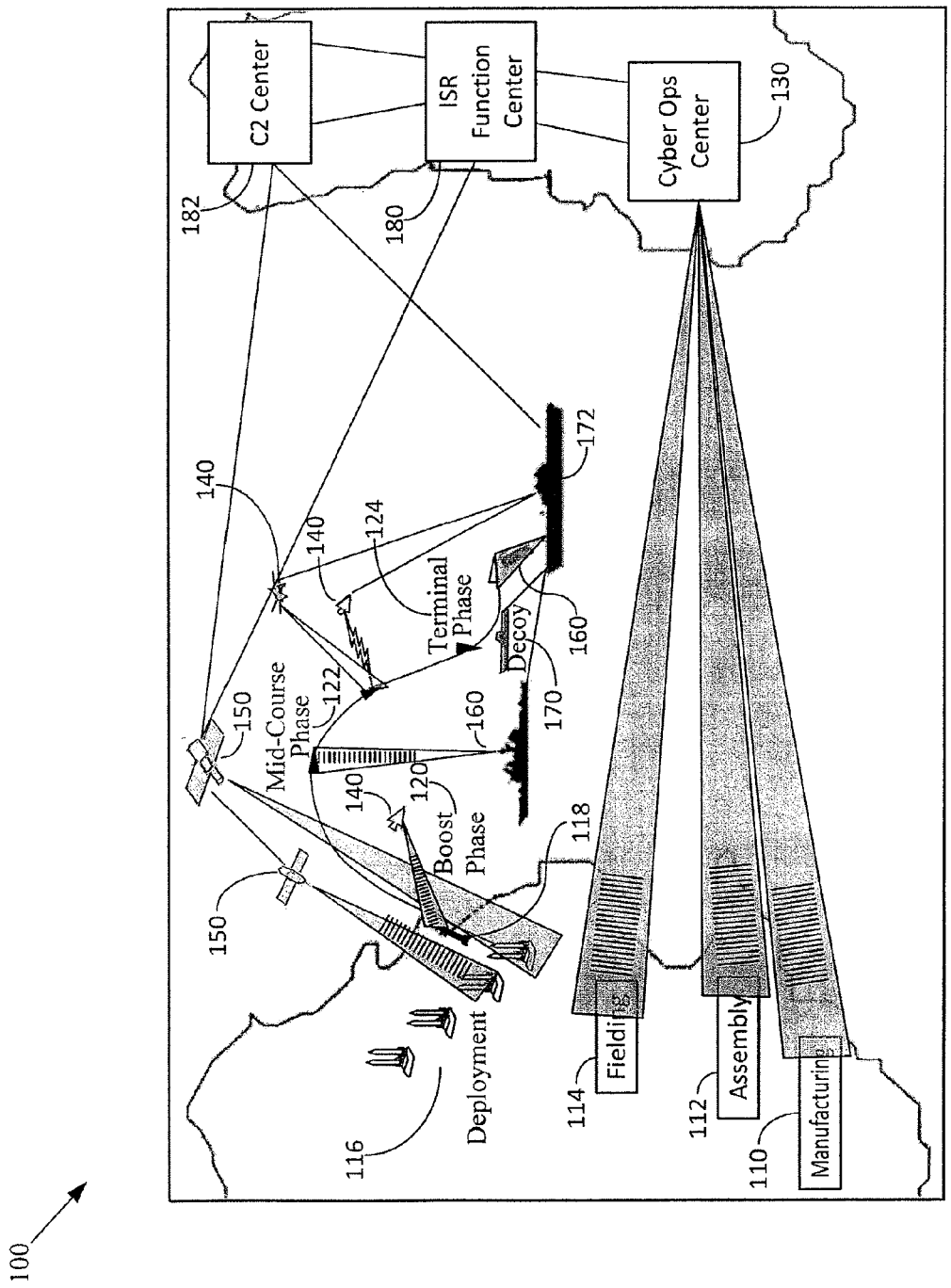
FIG. 1 is an exemplary notional layered asymmetric missile defense (AMD) operational view.

FIG. 1 illustrates a notional layered AMD operational view 100 according to an embodiment. In FIG. 1, enemy manufacturing 110 and assembly areas 112 for producing missiles that may be considered a threat. Once manufacturing 110 and assembly 112 are completed, missiles are moved to a fielding area 114 where they are prepared for deployment areas 116. Once a missile 118 is launched, the missile 118 enters a boost phase 120 and then a mid-course phase 122. Next, the missile 118 enters a terminal phase 124 where the missile 118 attempts to disable or destroy a target. Defending against the missile 118 may be desirable, especially if the target has a high value.

Various techniques may be used to negate a threat posed by the missile 118. Such techniques include effects that may be applied at different stages of the threat. For example, a cyber operations center 130 may be employed to achieve non-kinetic objectives, such as preparing the battlefield, attacking opposition networks and communications systems, and creating effects on the systems associated with the threat. The techniques employed by the cyber operations center 130 may be directed against the manufacturing area 110, the assembly area 112 and the fielding area 114 area. However, deployment of these effects by the cyber operations center 130 is not limited to these areas.

Additional assets, such as airborne jamming 140, satellite countermeasures 150, surface and sea electronic counter measures 160, etc., may be brought against the threat during the boost phase 120, mid-course phase 122 and terminal phase 124. Further, a decoy payload 170 may be used to simulate a radar return from a large ship 172 overlapping the "target" signal. The decoy 170 provides a larger, more attractive target to the missile 118 consistent with the range and angle tracking of an anti-ship missile 118 and moves slowly away from the ship 172, thus defeating the threat. The combination of these techniques provides a layered antimissile defense system to missile threats. Intelligence and surveillance data may be coordinated by an intelligence, surveillance and reconnaissance (ISR) function center 180. A command and control (C2) center 182 may be used to plan and to coordinate application of one or more of the techniques for mitigating or negating the threat.

According to an embodiment, a layered AMD system provides a probability of missile threat negation against many threats including large, complex raids, and sophisticated multi-dimensional threats. Moreover, a method according to an embodiment provides a probability that a combination of non-kinetic and kinetic effects will be able to negate the threat posed by one or more missiles 118 launched against friendly targets, e.g., the ship 172. Strategic and tactical planning endeavors are supported, as well as to guide decisions related to the deployment of both non-kinetic and kinetic weapons.

Figure 2:
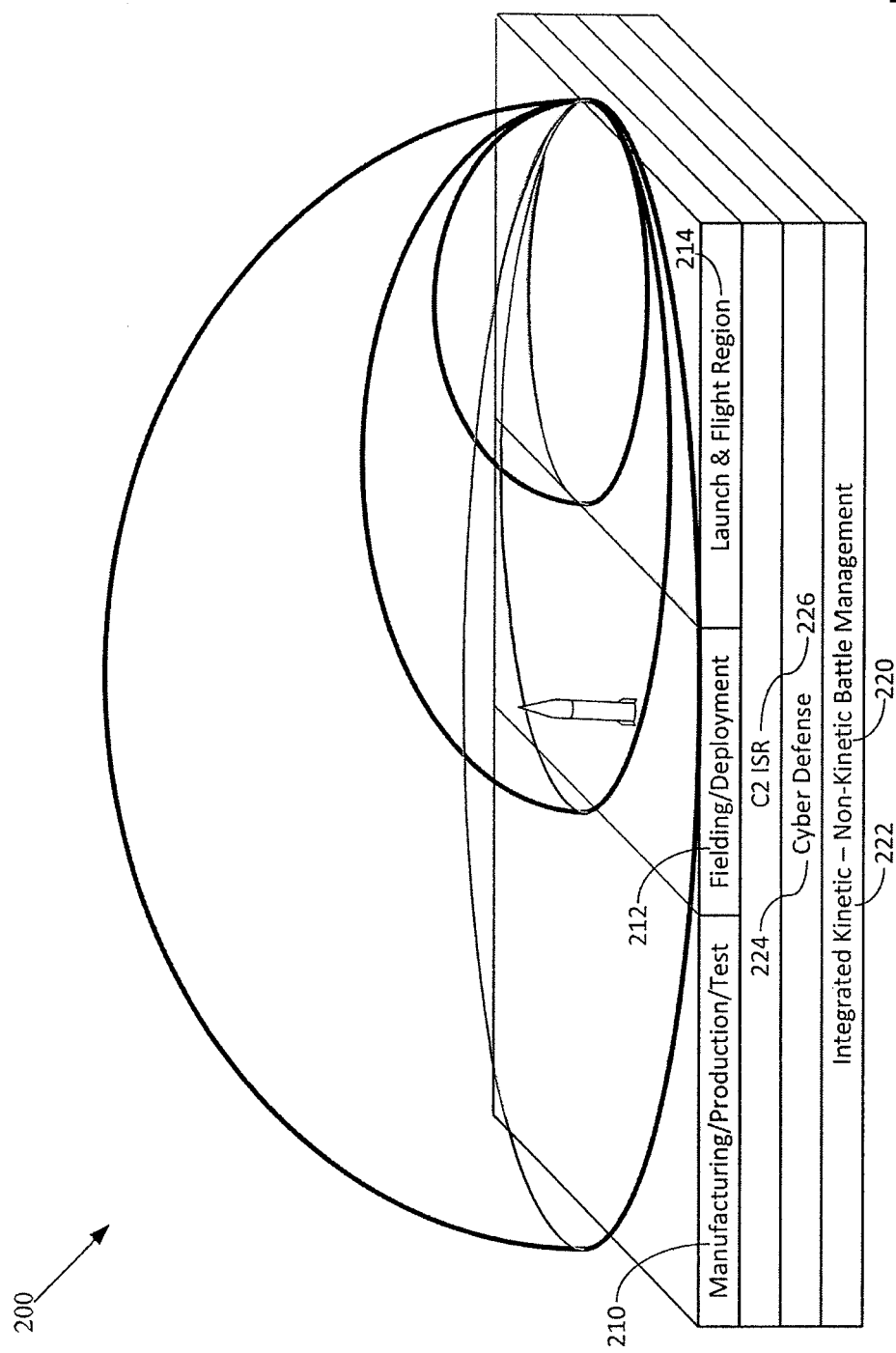
FIG. 2 is a layered framework for non-kinetic missile defense assessment according to an embodiment.

FIG. 2 illustrates the layered framework 200 for non-kinetic missile defense assessment according to an embodiment. In FIG. 2, the manufacturing, production and test phase 210, the fielding and deployment phase 212, and the launch and flight phase 214 are illustrated. Non-kinetic techniques 220 may be used to complement kinetic techniques 222. For example, non-kinetic cyber defense techniques 224 may be used to prepare the battlefield, to attack opposition networks and communications systems, and to create effects on the systems associated with the threat. Command and control, intelligence, surveillance and reconnaissance (C2 ISR) measures 226 may be used to validate and verify the disruption of the launch of missile threats and the command and control for carrying out an attack.

For example, in the manufacturing, production, and test phase 210 material defects that will propagate through the entire life cycle are induced early in the process. During fielding deployment phase 212, cyber measures 224 may be used to disrupt launch of missile threats and the command and control for carrying out an attack. C2 ISR measures 226 may then be used to validate and verify the initial and continuing success of the cyber measures 224. Material integrity may be degraded and failures during software and hardware upgrades may be induced. During the boost phase 214, techniques for disrupting and degrading material integrity, degrading communication uplinks, initiating self-destruct, disrupting guidance systems, etc. may be exploited. During the mid-course and terminal phases, techniques may also be used to disrupt and/or degrade material integrity, sensors, and guidance systems.

Figure 3:
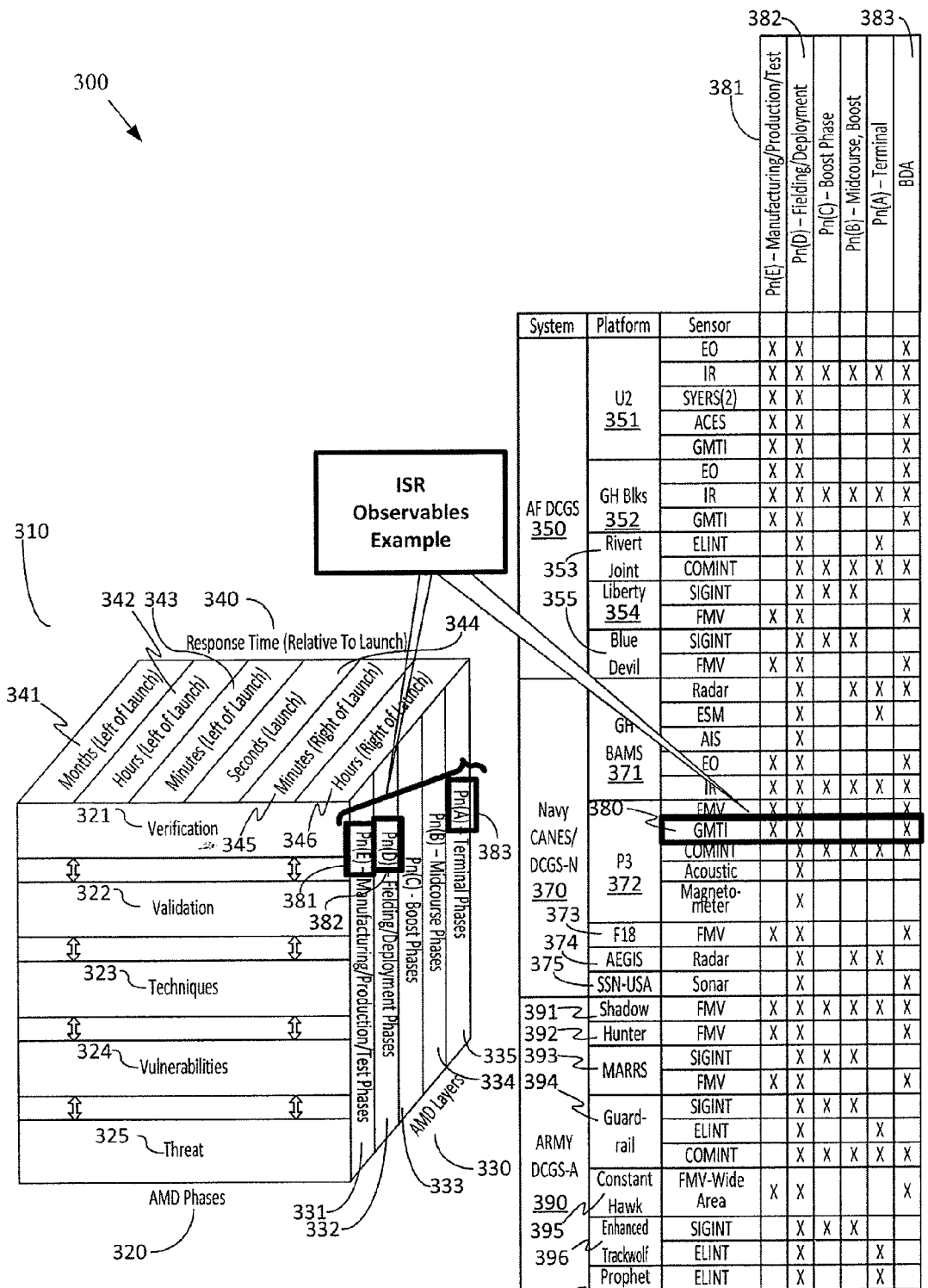
FIG. 3 is a mapping of intelligence, surveillance and reconnaissance-processing, exploitation, and dissemination (ISR-PED) sensors to an AMD analysis framework according to an embodiment.

FIG. 3 illustrates mapping 300 of intelligence, surveillance and reconnaissance-processing, exploitation, and dissemination (ISR-PED) sensors to the analysis framework 300 according to an embodiment. The analysis framework (also referred to as an "AMD Mission Thread Analysis and Modeling (MTAM) framework") 310 is a three-dimensional matrix of AMD phases 320, AMD layers 330 and the response time relative to launch 340. The AMD phases 320 may include verification 321, validation 322, techniques 323, vulnerabilities 324 and threats 325. The AMD layers 330 may include calculation of the probability of negation for the Manufacturer/Production/Test Phase 331, the Fielding/Deployment Phase 332, the Boost Phase 333, the Mid Course Phase 334 and the Terminal Phase 335. The response times relative to launch 340 may include months left to (before) launch 341, hours left to launch 342, minutes left to launch 343, seconds to launch 344, minutes right of launch 345 and hours right of launch 346. The AMD layers have associated mathematical probabilities of success derived from the AMD mathematical tool (e.g., math tool 720 shown in FIG. 7). The AMD Layers 330 may equate to the timing 340 of missile launch operations and may include both left-of-launch and right-of-launch time elements.

In FIG. 3, three exemplary systems are shown, Air Force Distributed Common Ground System (AF DCGS) 350, Navy Consolidated Afloat Networks and Enterprise Services (CANES)/Distributed Common Ground System (DCGS) 370, and Army Distributed Common Ground System (DCGS) 390. In an embodiment, any detection system is implemented. In another embodiment, a space detection systems, a sea detection system, and/or a land detection system is implemented. The AF DCGS 350 is broken down into five platforms, i.e., U2 351, Global Hawk blocks (GH Blks) 352, Rivet Joint surveillance aircraft 353, the Liberty platform 354 and the Blue Devil sensor platform 355. Navy CANES/DCGS-N 370 is broken down further into GH BAMS 371, P-3 surveillance aircraft 372, F-18 Hornet aircraft 373, AEGIS 374 and SSN-USA attack submarine platforms 375. Army DCGS-A 390 is broken down into seven platforms, i.e., Shadow surveillance platform 391, Hunter airborne platform 392, medium altitude reconnaissance and surveillance systems (MARSS) 393, Guardrail signals intelligence (SIGINT) collection and precision targeting location system 394, Constant Hawk persistent surveillance wide field of view airborne intelligence, surveillance and reconnaissance (AISR) system 395, Enhanced Trackwolf surveillance system 396 and Prophet ground platform 397. For each platform, associated sensors are shown and each sensor is indicated as being mapped to each of the AMD layers. For example, ground moving target indicator (GMTI) sensor 380 for the P3 platform 372 is mapped to a probability of negation for the manufacturer/production/test phase 381, a probability of negation for the fielding/deployment phase 382 and the battle damage assessment (BDA) 383, which is the product of the a priori conditional probabilities of negations of applicable AMD layers.

Figure 4:
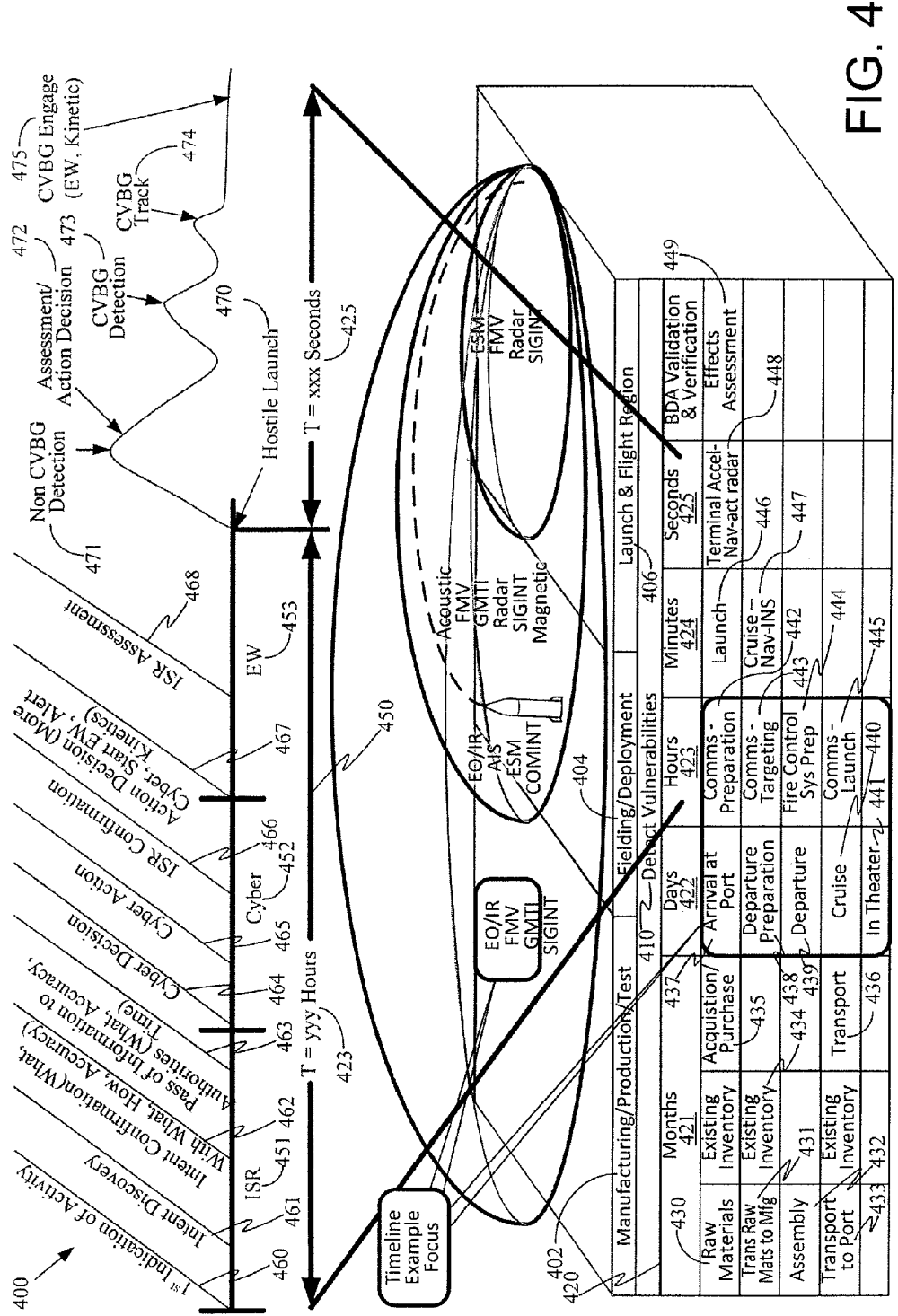
FIG. 4 is a threat analysis time line correlated with asymmetric layered framework according to an embodiment.

FIG. 4 illustrates a threat analysis time line correlated with asymmetric layered framework 400 according to an embodiment. In FIG. 4, the manufacturing, production and test phase 402, the fielding and deployment phase 404, and the launch and flight phase 406 are illustrated. Vulnerabilities 410 are detected as shown relative to response times 420 associated with launch of a missile. For example, months before launch 421, vulnerabilities 410 may include raw materials 430, raw materials that are transformed into material to manufacturing 431, and assembly of components 432 and the transport of materials 433. Existing inventory of raw materials 434 and other components associated with different stages of manufacturing may be considered. Other vulnerabilities 410 during the manufacturing, production, and test phase 402 may include the acquisition and purchase of materials 435 and the transport of materials 436. Days before launch 422, vulnerabilities 410 may include arrival of missile at the deployment area 437, departure preparation 438, the departure 439 and cruise 440 to the deployment area and deployment in the theater of operations 441. Hours before launch 423, vulnerabilities 410 may include communications preparation 442, targeting communications 443, fire control system preparation 444 and launch communications 445. In the minutes timeframe 424, vulnerabilities 410 may involve the launch 446 and the inertial navigation system (INS) 447.

During the seconds timeframe 425, vulnerabilities 410 may include the terminal guidance system 448 which relies upon the acceleration data, active radar signals and other data (e.g., gyroscopic data, global positioning system data, etc.). Probabilities of negation for the layers are used to provide battle damage assessment validation and verification which provides assessment of the effects of the applied techniques 449.

The timeline 450 may include an hours before launch timeframe 423 and a seconds timeframe 425. During the hours timeframe 423, a section for ISR 451, cyber operations 452, and electronic warfare 453 are shown. The ISR 451 involves determination of the first indication of activity 460, discovery of the intent of the adversary 461, confirmation of the intent 462, and the passing of the information to authorities 463. The cyber operations 452 may include arriving at a cyber decision 464, carrying out the cyber action 465, ISR confirmation 466 and subsequent action decisions 467, e.g., more cyber effects, start electronic warfare, alert kinetics, etc. The electronic warfare phase 453 begins by analysis of the ISR assessment 468.

After hostile launch 470, during the seconds timeframe 425, non-carrier battle group (CVBG) detection 471 may occur. Assessment and action decision 472, based on the non-CVBG detection, may be made. Next, the carrier battle group may detect the missile 473 and begin to track the missile 474. The carrier battle group may engage the missile using electronic warfare and kinetic weapons 475.

The AMD math tool 720 (FIG. 7) may include four computational levels. Computational Level 1 is the basic factors level where a $P_{negation}$ ($P_n$) score is computed for each vulnerability and technique (VT) pair. Computational Level 2 coverts the VT sores into random variables, derives probability distribution functions for each random variable, and then conditions $P_n$(VT) on Time (Ti). Thus, Computational Level 2 may be considered the temporal level at which $P_n$(VTTi) is calculated for each VT Pair. Computational Level 3 is the battle damage assessment (BDA) level where $P_n$(VTTi) values are conditioned based on additional factors related to assessment of the potential success of the technique including the probability of validation of deployment ($P_{vd}$) and the probability of verification of mitigation ($P_{vm}$). The probability of validation of deployment ($P_{vd}$) may also be referred to as $P_{tip}$. Computational Level 4 is the terminal phase level wherein $P_n$ for the terminal phase is calculated by combining the a priori conditional $P_n$ values computed for the previous four AMD Layers.

FIG. 5 illustrates a first computational level 500 according to an embodiment. Computational level 1 500 provides a scoring system for the probability of effectiveness, $P_e$ 510, and the probability of deployment, $P_d$ 540, according to an embodiment. FIG. 5 shows that the probability of negation for each vulnerability and technique (VT) pair, $P_n$(VT) 570, is the product of the probability of effectiveness, $P_e$, 510, and the probability of deployment, $P_d$ 540.

$P_e$ 510 is a combination of probability of success ($P_{su}$) 520 and probability of severity ($P_{sv}$) 530. Probability of deployment ($P_d$) 540 is a combination of techniques probability of placement ($P_p$) 550 and probability of activation ($P_a$) 560 for that VT pair. The values of $P_e$ 510 and $P_d$ 540 are determined by combination of actual data and information from subject matter experts via rule-based value derivation process.

For each of $P_{su}$ 520, $P_{sv}$ 530, $P_p$ 550, and $P_a$ 560, a range of assessments 580 are given which relate to a corresponding range of scoring levels 590. For example, $P_{su}$ 520, i.e., the probability of success, may be assessed as being very likely 521, likely 522, neutral 523, unlikely 524 or very unlikely 525. $P_{sv}$ 530, i.e., the probability of severity, may be assessed as being destroy 531, disrupt 532, deny 533, degrade (deter) 534 and deceive 535. $P_p$ 550, i.e., the probability of placement, may be assessed as being very achievable 551, achievable 552, neutral 553, likely unachievable 554 and very likely unachievable 555. $P_a$ 560, i.e., the probability of activation, may be assessed as being very achievable 561, achievable 562, neutral 563, likely unachievable 564 and very likely unachievable 565. The scoring levels 590 are 0.9, 0.7, 0.5, 0.3 and 0.1.

Thus $P_n(VT)$ 570 is the probability of deterring an adversary from performing specific actions that directly related to the ability to detect opportunistic events from the farthest point left of launch, to the point leading up to the action and the ability to affect them, i.e., a score that ranks the negation with respect to the effectiveness of a specific technique against a specific vulnerability. Therefore, $P_n(VT)=P_e \times P_d$ OR $P_n(VT)=(P_{su} \times P_{sv}) \times (P_p \times P_a)$.

For example, if a specific technique would likely be successful when used against a specific vulnerability, and if that technique would destroy an adversary's capability if it was successful, and if the placement of that technique was likely unachievable, and if activation of the technique was very achievable if it was deployed then: $P_n(VT)=(P_{su} \times P_{sv}) \times (P_p \times P_a) = 0.7 \times 0.9 \times 0.3 \times 0.9 = 0.1701$.

Figure 6:
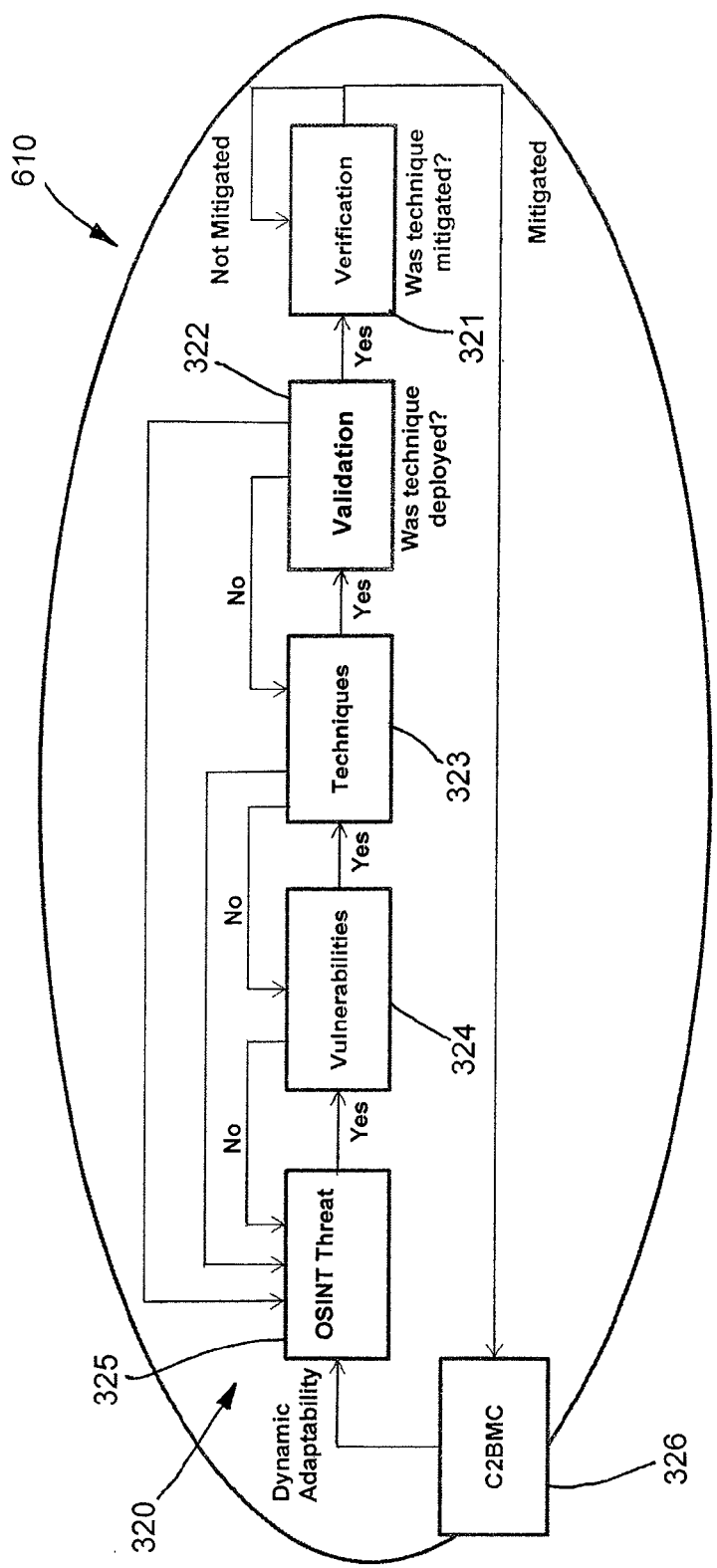
FIG. 6 is a flow chart of an analytical assessment framework including the phases of the framework of FIG. 3 providing feedback to and from command and control, battle management, and communications (C2BMC).

FIG. 6 is a flow chart of an analytical assessment framework 610 that may include the phases of the MTAM framework 310 of FIG. 3 providing feedback to and from command and control, battle management, and communications (C2BMC) 326. The AMD process phases, as described in FIG. 3, may include the following phases: threat assessment 325 (e.g., open source intelligence (OSINT)), vulnerability assessment 324, techniques assessment 323, validation assessment 322, verification assessment 321, and feedback to and/or from C2BMC 326. The threat assessment 325 may use open sources to collect unclassified intelligence about the threat. The vulnerability assessment 324 may use lessons learned to identify vulnerabilities associated with the threat. The techniques assessment 323 may identify techniques and capabilities to exploit the vulnerabilities. The validation assessment 322 may prove that the techniques were deployed and were initially successful. The verification assessment 321 may show that the deployed techniques remain effective and, if mitigated, provide feedback to C2BMC 326. The feedback to and from the C2BMC 326 may ensure an integrated solution to missile defense in which AMD provides vital input.

The analytical assessment framework 610 may be interactive at each step to allow real-time adaptability to a dynamically changing mission environment. The AMD process phases 320 may provide a framework for the analytical assessment framework 610 to provide a complete missile defense thread through which AMD may provide a non-kinetic technique to negate one or more identified threats.

Figure 7:
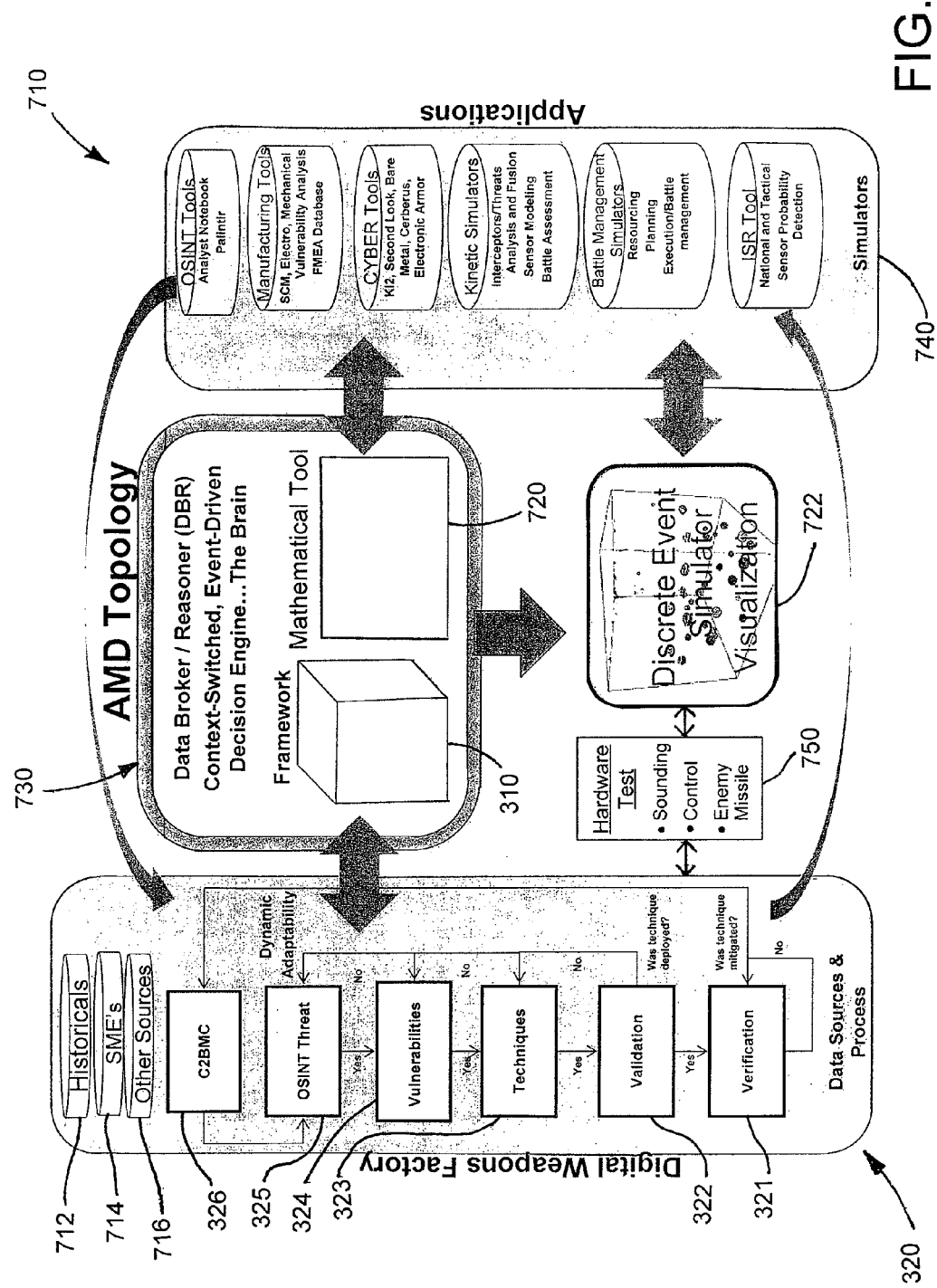
FIG. 7 is a flow chart of an analytical assessment framework including the phases of FIG. 6.

FIG. 7 is a flow chart of an analytical assessment framework 710 including the phases of FIG. 6. The analytical assessment framework 610 may provide a foundation for the analytical assessment framework 710. The analytical assessment framework 710 provides a visualization of the potential contributions of the AMD approach across a missile life cycle. The analytical assessment framework 710 may include data collection from historical data bases 712, subject matter experts (SMEs) 714, and other sources 716 (such as DoD and agency customers) to support all phases of the AMD phases 320. As shown in the middle of the flow chart, the data may be parsed by a data broker reasoner (DBR) 730 and sent to one or more simulator tools (e.g., missile defense simulators) 740, and/or discrete event simulation and visualization tools 722 to generate probability of negation (Pn) results, where Pn represents ballistic missile non-kinetic technique success. An exemplary DBR is disclosed in U.S. application Ser. No. 14/109,059 filed Dec. 17, 2013, which is hereby incorporated by reference in its entirety.

The DBR 730 may be a context sensitive switching, event detection, and correlation engine that identifies and distributes mission relevant information (e.g., data, requests, and commands) to other applications based on the context of the information with respect to the AMD mission phase(s) it supports. The DBR 730 may monitor system operating heath events during the entire mission life cycle and take necessary steps to react to unexpected events according to the CONcept of OPerations (CONOPs) policy.

The DBR 730 may include the mathematical tool 720 (e.g., the math tool above regarding FIG. 5). The output of the DBR 730 may be fed into the simulators 740, math tool 720, and the discrete event simulation and visualization tool 722 to generate probability of negation (Pn) results, where Pn represents ballistic missile non-kinetic technique success. Pn results may be displayed for each AMD layer 330 (shown in FIG. 3) using a discrete event simulation and visualization tool 722 (e.g., ExtendSim Visualization). The discrete event simulation and visualization tool 722 may also allow the user to select different process phases (e.g., AMD phases 320) for generation and display of Pn results.

Simulators 740 may also include a simulated hardware test. For example, the simulators 740 may run on a test bench that includes rocket control station software, the flight computer, communications links, and/or GPS.

Simulators 740 may feed back into both the math tool 720 and the discrete event simulation tool 722 to generate new results. The discrete event simulation tool 722 allows selection of a different process phase (e.g., any of AMD phases 320) with data combinations that may feed back into both the math tool 720 and the simulators 740 to generate new results.

The analytical assessment framework 710 may include a physical hardware test 750 in which a response tool, such as one or more digital defects, may be deployed to exploit and manipulate known vulnerabilities (e.g., vulnerabilities in software and/or communications capabilities) for an actual missile (e.g., a sounding rocket). As each test is run the results may be stored in the historical data bases 712 and the results may be communicated to the other processes in the analytical assessment framework 710 to increase accuracy of provided results. For example, a sounding rocket test may be successful and the successful rocket test may be stored in the historical data bases 712. The digital weapons factory, described in concurrently-filed U.S. Application "Digital Weapons Factory And Digital Operations Center For Producing, Deploying, Assessing, And Managing Digital Defects,", the discrete event simulation and visualization tool 722, the DBR 720, and/or the simulators 740 may retrieve information related to the successful rocket test and produce a new result based on the updated information regarding the successful sounding rocket test. A missile control test or an enemy missile test may also be performed and may provide additional information that may adjust results and/or probabilities generated by the analytical assessment framework 710.

The threat process phase 325 may apply any suitable OSINT analysis techniques (e.g., a RAYTHEON® OSINT analysis technique). These analytical techniques may use non-attributable networks and personas to research customer directed topics. In the case of missile systems, the technique may not directly research the missile due to significant security barriers and potential to raise an adversary's awareness of the investigation. Also, if the opponent becomes aware of the research, the possibility of misinformation increases. Hence, vetting of data and understanding source reliability alongside information reliability may remain central to the quality of the threat analysis 325.

Figure 8:
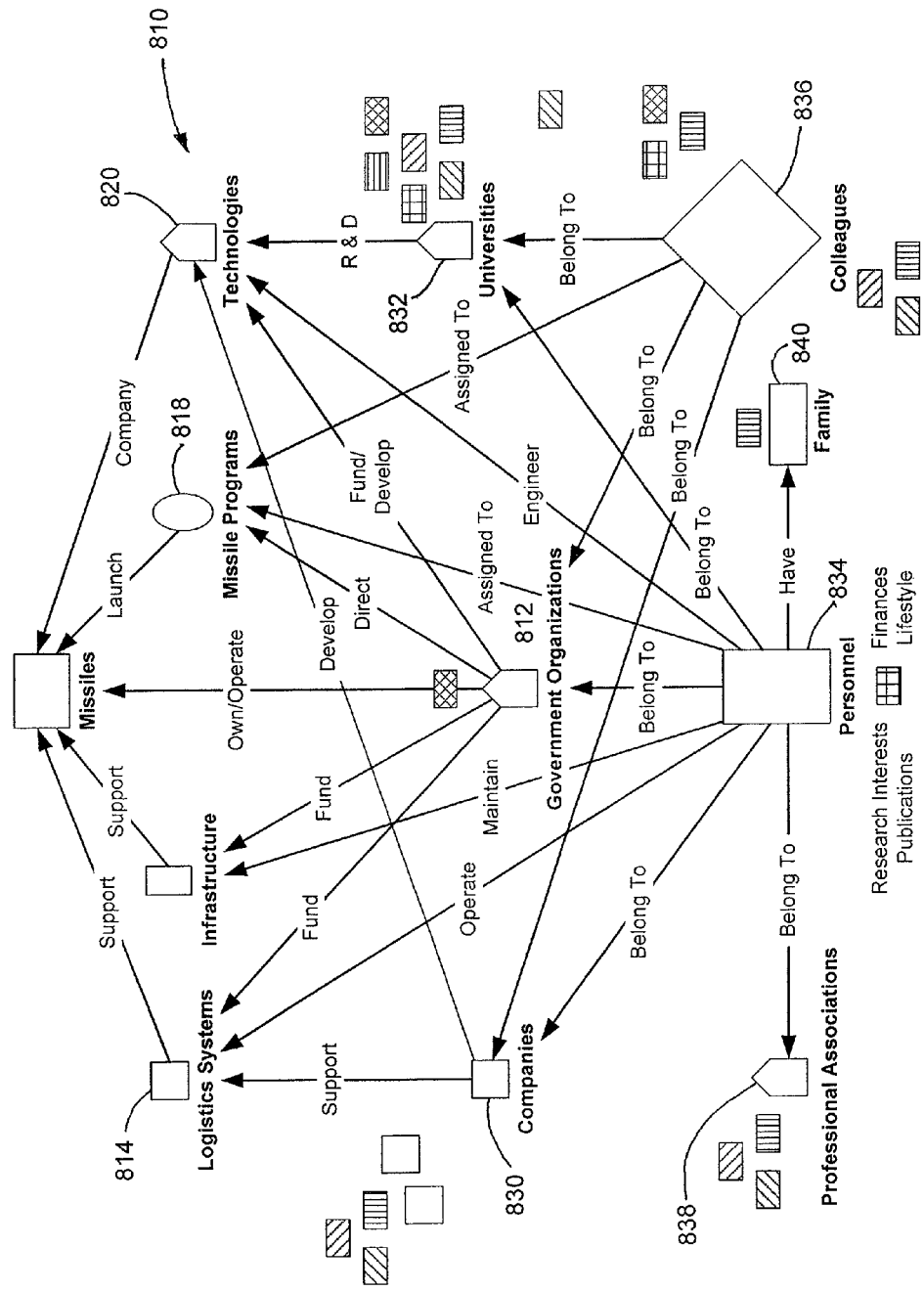
FIG. 8 is an intelligence mapping showing the components (e.g., technologies, infrastructure, and personnel) comprising all phases (e.g., creation through deployment) of the lifecycle of a missile targeted by the analytical assessment framework.

Modeling provides a method of developing topics for research. For example, a model, as shown in FIG. 8, may be created for one of more social networks surrounding all phases of life for a missile system: requirements development, critical technology development (research and development), manufacturing and testing, deployment, operations and maintenance, and training exercises. Each phase may include associations branching further away from the system under study. Security may be less robust for associations further away from the system under study compared to associations closer to the system. FIG. 8 is a conceptual model of a lifecycle 810 of a missile targeted by the analytical assessment framework 610. The lifecycle 810 may include relationships between a missile, its closest activities (e.g., government 812, logistics 814, infrastructure 816, programs 818, and/or technologies 820), and/or next tier associations (e.g., companies 830, universities 832, personnel 834, colleagues 836, professional associations 838, and/or family 840). Additional elements of the lifecycle 810 may be added for OSINT researchers within an OSINT analytical cell.

For example, an OSINT cell may explore a social network associated with the missile by social network mapping. Social network mapping provides high value intelligence insights by looking at the institutions, professional societies, people, computers, and government sponsors involved in the missile's development. For example, selected topics may be searched for in terms of publications in refereed journals and international symposia. Due to the cost constraints and timeline pressures the sponsoring governments typically impose, participation in international symposia becomes an important tool in the research and development phase of a weapon program. Many times the researches actively seek out advice of peers through professional organizations and symposia. The topics, their authors, and the author's affiliations all provide useful hints at the stage of development for a critical technology. This form of model drives the development of a second link diagram where information and sources may be collected and linked, by subject and/or by geo-spatial relationship. An exemplary lifecycle model for an MaRV. At appropriate intervals the OSINT research cell may engage subject matter experts on technologies or languages to aid in analysis. The selective use of linguists allows cost reductions because full-time translators for the research materials are unnecessary. Instead, automatic translation utilities, such as those found in many search engines, may prescreen the information and identify specific technical documents such as foreign language research papers published by known entities within the social network for further focus by linguists and technology subject matter experts. Subject matter experts might be engaged for rocket motor chemistry and recent publications on propulsion. Another example might be recent papers published on radio frequency (RF) direction finding and geolocation techniques. In the case of RF expertise, one or more units, each with unique capabilities, may be engaged. For example, a space and airborne systems for airborne radar systems, integrated air and missile defense (IAMD) systems for land-based early warning radars, network-centric systems for RF datalinks expertise, missile systems for signal combat identification and direction finding, and Intelligence and information systems for geolocation and dedicated "INT" analysis such as SIGINT, ELINT, etc.

The OSINT approach is a scientifically based research methodology that allows a group to maintain focus and avoid "group think" pitfalls by requiring rigor in the research being conducted. As sources are uncovered, the source may be cited and assigned a confidence level. As new, supporting information is obtained, the confidence for a given fact can either be increased or decreased based on subsequent information and its source reliability. A standard methodology within the intelligence community assesses both source reliability and the information reliability on alpha-numeric scales. For example, Table 1 provides intelligence source reliability and information reliability potential definitions.

A rapid assessment may be made of source material and the information conveyed. For example, a rating of 5 may be of a type "E"—as used in the U.S. Army FM 2-22.3, Human Intelligence Collector Operations, the entirety of which is hereby incorporated by reference in its entirety—categorizes information provided as from a known liar and makes no reasonable sense for the circumstances.

TABLE 1

Intelligence source reliability and information reliability definitions.

| | Source Reliability | | | Information Reliability | |
|---|---|---|---|---|---|
| A | Reliable | No doubt about the source's authenticity, trustworthiness, or competency | 1 | Confirmed | Logical, consistent with other relevant information, confirmed by independent sources. |
| B | Usually Reliable | Minor doubts. History of mostly valid information. | 2 | Probably True | Logical, consistent with other relevant information, not confirmed. |
| C | Fairly Reliable | Doubts. Provided valid information in the past. | 3 | Possibly True | Reasonably logical, agrees with some relevant information, not confirmed. |
| D | Not Usually Reliable | Significant doubts. Provided valid information in the past. | 4 | Doubtfully True | Not logical but possible, no other information on the subject, not confirmed. |
| E | Unreliable | Lacks authenticity, trustworthiness, and competency. History of invalid information. | 5 | Improbable | Not logical, contradicted by other relevant information. |
| F | Cannot be Judged | Insufficient information to evaluate reliability. May or may not be reliable. | 6 | Cannot be Judged | The validity of the information cannot be determined. |

Another objective methodology for scoring confidence of intelligence analysis can be implemented based on Peterson's work on analytical confidence of intelligence. (See, Peterson, J. (2008). Appropriate Factors to Consider when Assessing Analytic Confidence in Intelligence Analysis. Erie, Pa.: Mercyhurst College, the entirety of which is incorporated by reference in its entirety. Table 2 provides Peterson's "Table of Analytic Confidence Assessment." The methodology of Peterson deals with multiple facets of the analysis: the information and analysis method(s), source reliability, expertise and collaboration (peer review), task complexity, and time pressure to produce the analysis. While not perfect, this provides an objective assessment of the analysis of a given topic and allows a numerical confidence weighting to be applied. For example, numerical values nearer 1.0 naturally indicate more confidence while values below a threshold, say 0.7 may indicate (use with discretion).

TABLE 2

Peterson Table of Analytic Confidence Assessment

| Peterson Table of Analytic Confidence Assessment | Range | Score | |
|---|---|---|---|
| Use of Structured Method(s) of Analysis | (1-10) | 7 | <=Fill in rating here |
| For example: ACH, IPB, social networking, Bayes, simulation, etc. 10 indicating the highest possible score when considering the below factors Consider: Number of methods used Applicability of methods to the analysis Level of robustness of method Degree of which methods' results coincide | | | |
| Overall Source Reliability | (1-5) | 3 | |
| A rating of 10 indicates the highest reliability | | | |
| Source Collaboration/Agreement: Level of Conflict amongst sources | (1-5) | 4 | <=Fill in rating here |
| 5: No confliction amongst sources 4: Very little conflict amongst sources 3: Moderate conflict amongst sources 2: Significant conflict amongst sources 1: Sources conflict on nearly all points | | | |
| Level of Expertise on Subject/Topic & Experience | (1-5) | 4 | <=Fill in rating here |
| 5: Deep, intimate knowledge and understanding and 3+ years experience with the topic 4: Wide knowledge and 1 to 3 years experience with the topic 3: Moderate knowledge and 6 to 12 months experience with the topic 2: Minimal knowledge and 0-5 months experience with the topic 1: No knowledge and no experience with the topic | | | |
| Amount of Collaboration | (1-5) | 3 | <=Fill in rating here |
| 5: Part of aggregated individual analyses 4: Worked on a team 3: Worked with a partner 2: Casual discussion 1: Completely individual work | | | |
| Task Complexity | (1-5) | 3 | <=Fill in rating here |
| 5: Minimally complex and challenging 4: Somewhat complex and challenging 3: Moderately complex and challenging 2: Quite complex and challenging 1: Very complex and highly challenging | | | |
| Time Pressure: Time given to make analysis | (1-5) | 2 | <=Fill in rating here |
| 5: No deadline 4: Easy to meet deadline 3: Moderate deadline 2: Demanding deadline 1: Grossly inadequate deadline | | | |
| | Score: | 26 | |
| | Total Possible: | 45 | |
| | Confidence: | 0.58 | |

Figure 9:
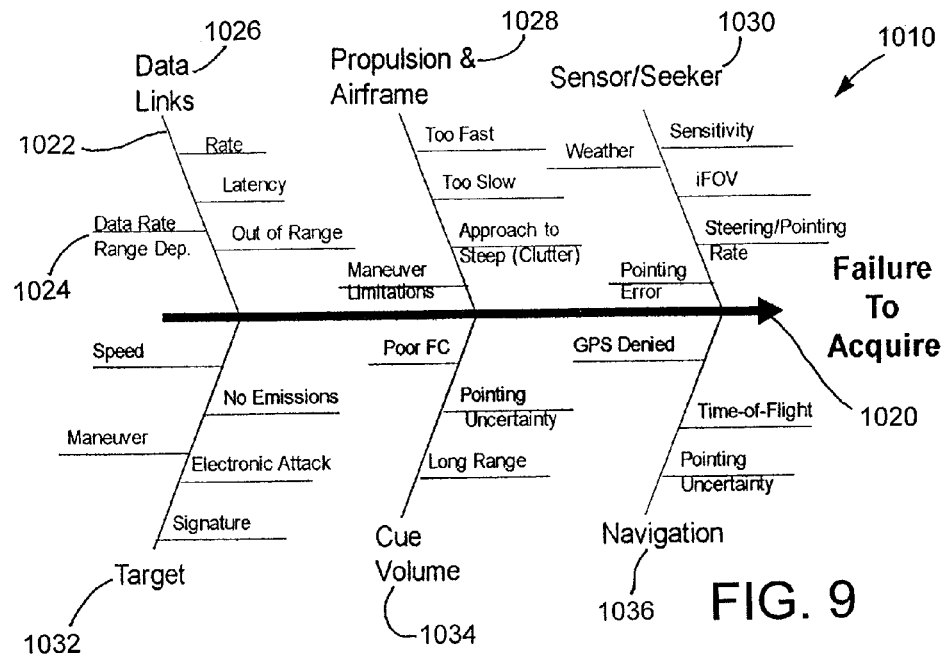
FIG. 9 is a Failure Ishikawa Diagram based on a failure to acquire a target.
Figure 10:
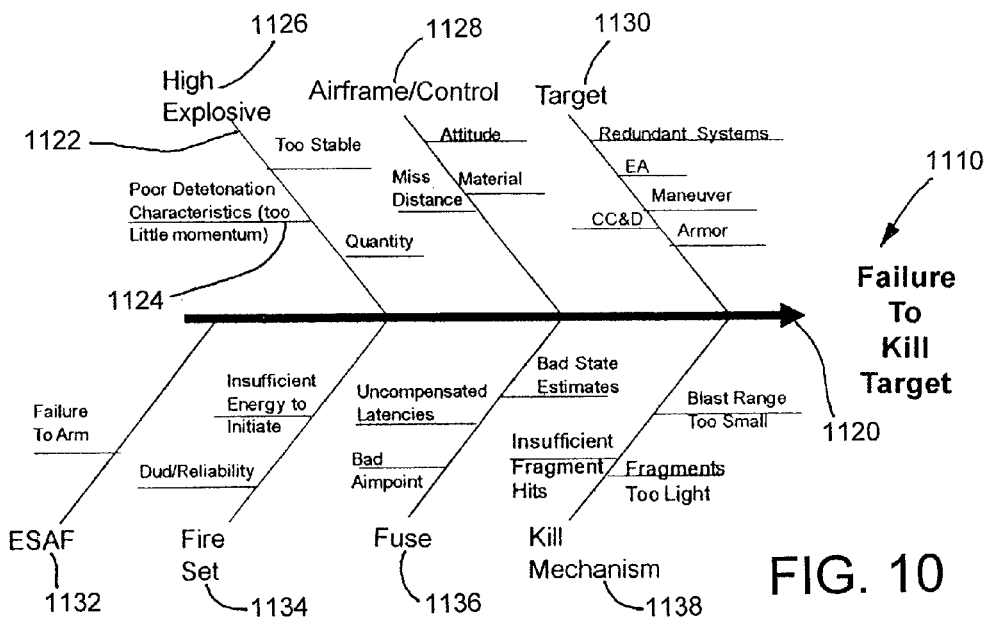
FIG. 10 is a Failure Ishikawa Diagram based on a failure to kill a target.

FIGS. 9 and 10 provide failure Ishikawa diagrams 1010, 1110 useful for developing vulnerability analysis and developing attack vectors. Failure mechanism maps can be constructed for a particular threat. For example failure Ishikawa diagram 1010 relates to a missile threat's failure to acquire a target, and Ishikawa diagram 1110 relates to a missile threat's failure to kill a target. This methodology is routinely used for conducting root-cause investigations for anomalous test events, and this same methodology can be inverted to look for pathways to attack and/or negate the missile.

For example, creating the failure Ishikawa diagrams 1010, 1110 is a visualization technique used during the analysis of failures used in quality assurance settings. The two examples diagrams 1010, 1110 place the root question on a main trunk 1020, 1120, then work major contributors on branches 1022, 1122 and minor contributors to a given minor branch 1024, 1124 to graphically decompose the failures to specific causes. The failure to acquire may be due to data links 1026, propulsion & airframe 1028, sensor/seeker 1030, target characteristics 1032, cue volume (cueing)/kill chain 1034, and/or navigation issues 1036. Failure to kill the target may stem from many problems including explosive 1126 (quantity or type), airframe/control 1128, target composition 1130, electronic safe-arm-fire (ESAF) device 1132, fire set (e.g., an explosive chain start failure), fuse 1136 (e.g., aiming and/or timing errors), and/or a kill mechanism issue. The diagrams 1010, 1110 may be useful tools in the formal root-cause investigation process, but may be implemented to develop attack vectors for the analytical assessment framework 610.

In an embodiment, the analytical assessment framework may create an attack to cause a failure to acquire, on a data link, on a kill chain (e.g., cueing/cue volume), and/or on a navigation system. In another embodiment, the analytical assessment framework may implement attacks during a design and/or a manufacturing phase to target a propulsion and/or an airframe component of a missile.

In another embodiment, the analytical assessment framework may create a failure in a warhead/payload of the missile. The failure in the warhead/payload may be accomplished by introducing artificial delays into fusing logic of the missile so the fuse prematurely or belatedly fires the warhead. In yet another embodiment, a payload directed attack might target an electronic safe-arm-fire device to prevent the payload from arming.

In yet another embodiment, the analytical assessment framework may target an airframe control program of the missile to cause a bias in the guidance and navigation such that the missile does not guide true, but guides to a large offset thereby missing the target by miles.

Each attack implemented by the analytical assessment framework may be derived from defining the effect desired (e.g., failure to acquire versus failure to kill the target) and then working the corresponding fault trees backwards to identify an entry point for attack.

Referring to FIG. 6, the Vulnerabilities process phase 324 may provide vulnerabilities assessment function as part of the MTAM framework 310 of FIG. 3. The vulnerability assessment function entails working with the customer community and subject matter experts (SMEs) to develop a greater understanding of a target space, to include all AMD layers 330 from manufacturing 331 to deployment 332 to the terminal phase 335.

For example, participants from a plurality of engineering departments with company (e.g., supply chain, manufacturing, quality assurance, operations and maintenance, and/or cyber security) may produce a vulnerability report that provides a threat-specific vulnerabilities assessment for a single MaRV threat, such as a threat from a mobile medium range ballistic missile (MRBM) system which initially deployed with a single MaRV capable of hitting an object the size of an aircraft carrier, from distances of up to 3000 km away.

The participants may identify and analyze threat-specific vulnerabilities. Also, a probability of negation, Pn, may be derived based on matching each vulnerability with a corresponding exploitation technique (e.g., a cyber exploitation technique). Pn is defined as probability to deter an adversary from performing a specific action is directly related to the ability to detect opportunistic events leading up to the action and the ability to affect them. For each vulnerability/technique Intersection (VT), the probability of negation (Pn) is calculated by multiplying the probability of effectiveness (Pe), and probability of deployment (Pd for that VT. The values of Pd and Pe are determined by a combination of actual data and solicitation of information from subject matter experts via a rule-based value derivation process (e.g. Failure Modes Effectiveness Analysis (FMEA)). An example FMEA report is provided in Table 3, below.

TABLE 3

| FMEA structure (Vulnerability Area: Acceptance Test/QA) | |
|---|---|
| Component #3: Probability of Effectiveness (Pe): category B2 | |
| Defects | Bad Tooling/Fixtures: Wrong Material; Incorrect Calibration; Wrong Dimensions; Wrong Torque Values/Calibration |
| Function | Product Acceptance |
| Operation Mode | In-Flight (Dynamic Environment); Transport to Launch; Vibration |
| Failure Mode and Cause: | Incorrect production dimensions/fit problems/over or under-torqued fasteners/Spoof: Falsify material specs, torque calibration or dimensional calibration |
| Failure Effect: | Latent Failure |
| Severity | 1-4: Could slow production or cause rework if discovered |
| Detection Methods | 100% visual inspection/calibration cycle |

Referring again to FIG. 6, the technique process phase 323 may identify techniques through which to exploit the vulnerabilities identified during the vulnerability process phase 324. The technique process phase 323 is exemplified in U.S. application Ser. No. 14/481,288 filed Sep. 9, 2014, which is hereby incorporated herein by reference in its entirety. For example, the exploitation techniques may be cyber-attack capabilities. As part of this process, the types of attacks may be categorized to create a basic format and contents for a cyber weapons inventory to be used.

The technique process phase 323 may also include a development of basic attack models where each attack model represents a description of a linkage between a specific system vulnerability and one or more corresponding attack mechanisms that can applied to that vulnerability. The technique process phase 323 allows set up of something equivalent to a "zero day" common vulnerability enumeration (CVE) model format to enumerate mission-specific attacks. These models may be used to support cyber modeling tools.

Given results from an AMD threats 325, vulnerabilities 324, and techniques 323 phases, performed as part of a vulnerability assessment, a cyber techniques team may perform the following subtasks as part of the techniques process phase 323: identify potential attack vector types across the various subsystems components throughout one or more AMD layers 330 (shown in FIG. 3); define types of exploitation techniques to be applied across the attack vector types; build and document "CVE-like" models based on exploitation techniques; and/or determine integration points with the cyber modeling tools.

Also, the techniques process phase 323 may include a "system thread analysis." System thread analysis includes defining and ranking exploits targeted at the vulnerabilities identified in one of the subsystem threads. For each exploit a team may document: an operational phase at which the exploit may be employed against the target; a time required to deploy and activate the technique(s); an intelligence support required to support the technique; an expected effect on the target; one or more potential secondary/tertiary effects; one or more methods for measuring battle damage assessment for a given technique; and/or an expected probability of success.

The team may identify and document as many exploits as possible within the time allotted. The list may be used to define a potential weapons inventory for the study. The vulnerabilities may be registered using the CVE models for incorporation into the cyber modeling tool. The output may be in the form of viewgraphs documenting the details described above.

The validation assessment phase 322 may use ISR assets and associated algorithms and techniques to validate that techniques deployed to exploit the threat vulnerabilities have been initially successful. For example, the algorithms and techniques described in concurrently-filed U.S. Application, "Process of Probabilistic Multi-Source Multi-INT Fusion Benefit Analysis," may be implemented during the validation assessment phase 322. The techniques may include a combination of processing exploitation and dissemination (PED) algorithms (e.g., activity based intelligence (ABI), screening, automatic target recognition (ATR), change detection (CD)), sensors (e.g., EO, IR, SAR), and/or platforms that carry the sensors (e.g., air breathing space-based). For example, Table 4 provides a selection of air breathing ISR Assets that can be Implemented for the validation assessment phase 322.

TABLE 4

| Air-Breathing ISR Assets | | |
|---|---|---|
| System | Platform | Sensor |
| AF DCGS | U2 | EO |
| | | IR |
| | | SYERS (2) |
| | | ACES |
| | | GMTI |

TABLE 4-continued

Air-Breathing ISR Assets

| System | Platform | Sensor |
|---|---|---|
| | GH Blks | EO |
| | | IR |
| | | GMTI |
| | Rivet Joint | EUNT |
| | | COMINT |
| | Liberty | SIGINT |
| | | FMV |
| | Blue Devil | SIGINT |
| | | FMV |
| Navy CANES/DCGS-N | GH BAMS | Radar |
| | | ESM |
| | | AIS |
| | | EO |
| | | IR |
| | P3 | FMV |
| | | GMTI |
| | | COMINT |
| | | Acoustic |
| | | Magnetometer |
| | F18 | FMV |
| | AEGIS | Radar |
| | SSN-USA | Sonar |
| Army DCGS-A | Shadow | FMV |
| | Hunter | FMV |
| | MARRS | SIGINT |
| | | FMV |
| | Guardrail | SIGINT |
| | | ELINT |
| | | COMINT |
| | Constant Hawk | FMV-Wide Area |
| | Enhanced | SIGINT |
| | Trackwolf | ELINT |
| | Prophet | ELINT |
| | Ground | COMINT |

Figure 11:
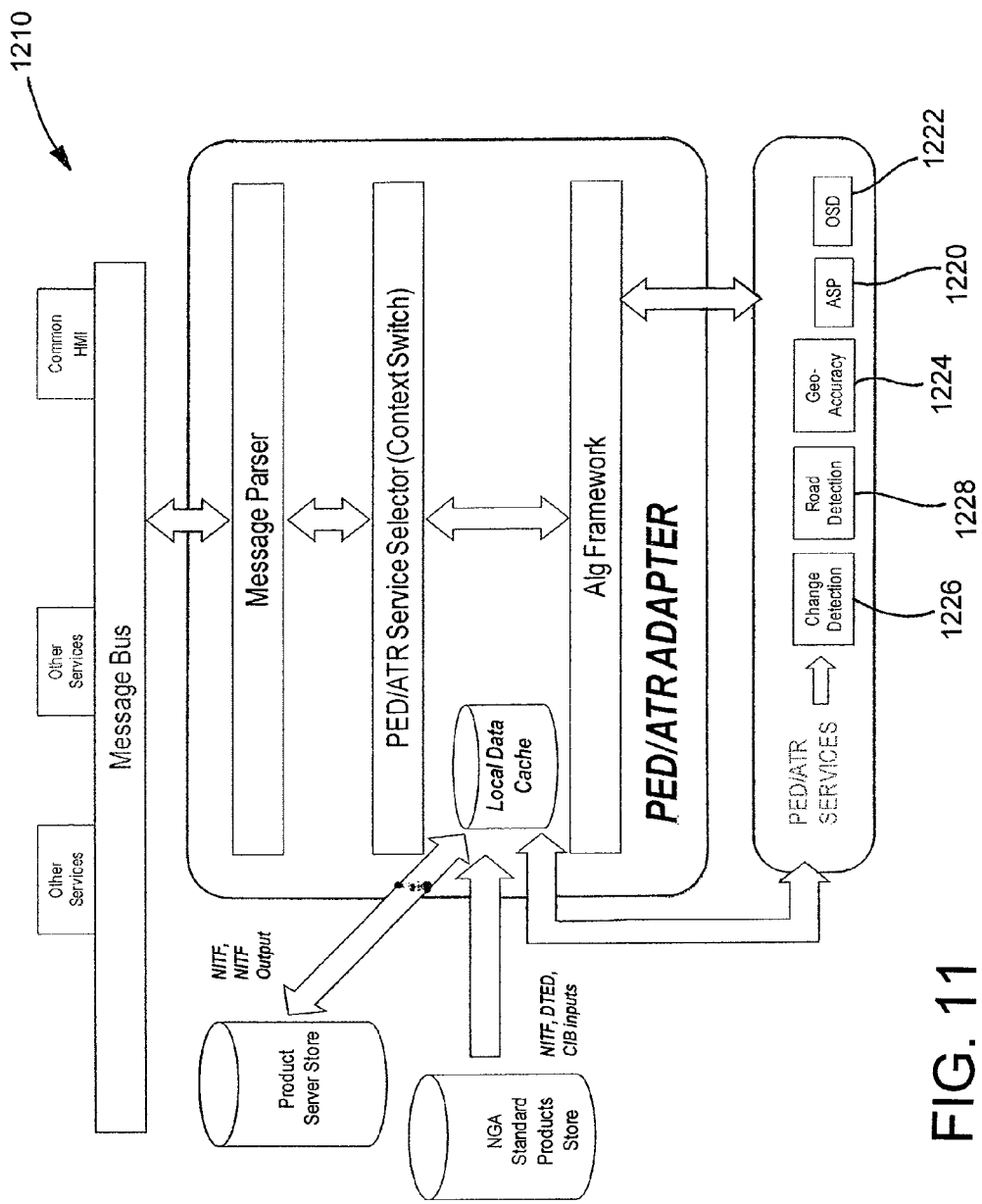
FIG. 11 is a processing exploitation and dissemination (PED)/automatic target recognition (ATR) adapter architecture.

The initial PED algorithms may be used as part of the analytical assessment framework 710 (shown in FIG. 7), and may be integrated through a PED/ATR adapter architecture 1210 (shown in FIG. 11).

The PED/ATR adapter architecture 1210 may include algorithms such as: advanced search protocol 1220 (ASP); ocean ship detection (OSD) 1222; geo-accuracy service 1224; change detection service 1226; and/or road detection service 1228.

The advanced search protocol 1220 (ASP) may locate small thermal targets in IR land imagery to expedite target detection. The ASP 1220 may produce a shapefile of the detections as the final product. Latitude and longitude of the detections may be available for subsequent processes.

The ocean ship detection 1222 (OSD) may use statistical measures to locate ships in open ocean and littoral areas using Electro-optical (EC)) or Infrared (IR) imagery. A summary of the detections and a shapefile may be created as the final product. Latitude and longitude of the detections may be available for subsequent processes.

The geo-accuracy service 1224 may remove geo-positioning errors of EO imagery by automatically tying the imagery to a controlled image base (CIB) or other available reference data. The output of the photogrammetric process may be used to update or create a National Imagery Transmission Format (NITF) sub header.

The change detection service 1226 may compare before and after EO or IR images of the same scene and create a two color multiview image enabling rapid operator awareness and assessment of activity. Autonomous cueing may be supported.

The road detection service 1228 may create a shapefile representing the roads and major pathways in an EO image by using a feature-based classifier and image quality attributes. The produced shapefile may be overlaid on the image to highlight roads on an SA display and to facilitate tasking for platform sensors. Extension to other sensor modalities may only require tuning.

Figure 12:
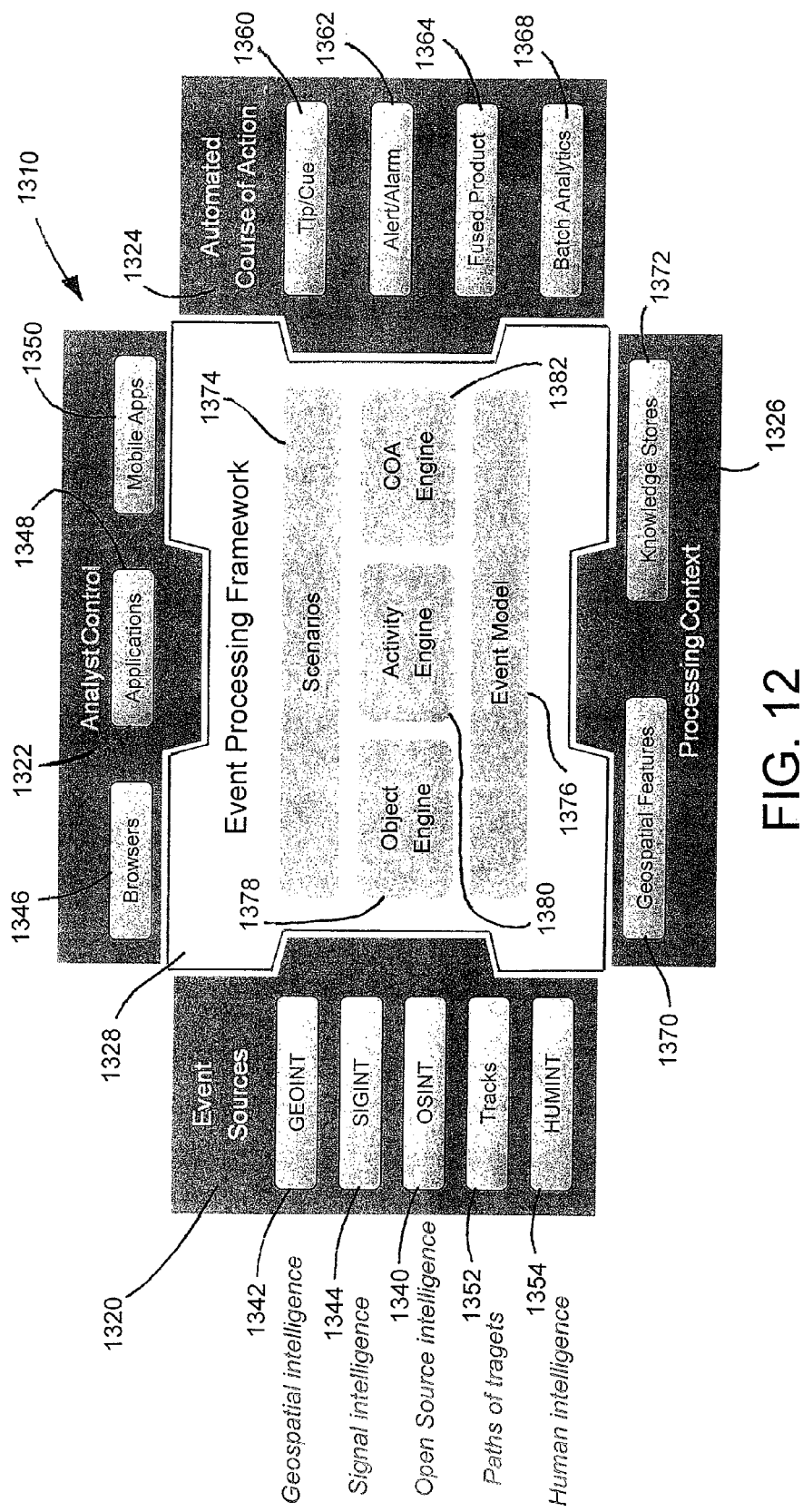
FIG. 12 is an activity based intelligence (ABI) multi-INT Analytics platform.

The verification phase 321 may apply ABI and/or CD techniques to verify that the exploitation techniques continue to be effective in negating the enemy threat for example, the missile threat. In addition to the change detection service 1226 applied during the validation phase 322, the verification phase may apply an ABI multi-INT analytics platform 1310 (shown in FIG. 12), for example, Intersect Sentry™, which may provide an open source, open standards solution that enables analysts to automate the discovery of important activities. Intersect Sentry™ is a comprehensive activity-based intelligence (ABI) analytics and automation solution that may provides real-time, automated decision support capabilities to help analysts identify the most relevant information in massive streams of multi-INT data. Intersect Sentry™ may operate on multiple systems and process data from across the a nation spanning thousands of miles.

The ABI multi-INT analytics platform 1310 may include an event sources module 1320, an analyst control module 1322, an automated course of action module 1324, a processing context module 1326, and/or an event processing framework module 1328. The event sources module 1320 may include OSINT data 1340, geospatial intelligence (GEOINT) 1342, SIGINT 1344, paths of target data 1352, and/or human intelligence (HUMINT) 1354. The analyst control module 1322 may include browsers 1346, applications 1348, and mobile applications 1350. The automated course of action module 1324 may include a tip/cue module 1360, an alert/alarm module 1362, a fused product module 1364, and/or a batch analytics module 1368.

The processing context module 1326 may include a data from geospatial features 1370 and/or from knowledge stores 1372. The event processing framework 1328 may include one or more scenarios 1374, an event model 1376, a streaming engine 1378, an activity engine 1380, and/or a course of action (COA) engine 1382.

Separately or in combination the modules 1320-1328 may perform verification steps that include an investigation of input data, a creation of verification scenarios, a determination of suitability of current analytics, and/or combinations of analytics.

The investigation of input data availability and suitability may support the ABI multi-INT analytics platform 1310 in a verification scenario. The creation of verification scenarios may be based on available data sources to determine patterns of life and detect changes and anomalies. The determination of suitability of current analytics within the ABI multi-INT analytics platform 1310 may support the verification scenario. The combinations of analytics may be based on what analytics may best meet the needs of the verification scenario and recommendations for any new or hybrid analytics that might be required.

In addition, the ABI multi-INT analytics platform 1310 may be tailored to support a single thread demonstration. The ABI multi-INT analytics platform 1310 enhances development of the AMD system architecture that may be used to drive product development by ensuring that the basic structure and behavior of the system, the system interfaces, and/or system limitations and constraints are well understood thus resulting in a successful operation. The ABI multi-INT analytics platform 1310 may utilize the tip/cue module 1360 for tipping and cueing in coordination with signals and imagery analysts. Also, the ABI multi-INT analytics platform may operate as a general purpose application for ABI. The ABI multi-INT analytics platform 1310 may provide a real-time analytics framework based on a JDL fusion model.

The event processing framework 1328 allows the elevation of lower level sensor data to higher level information through the application of analytics. For example, agent based analytics may be utilized in the ABI multi-INT analytics platform to allow the development of complex analytic processes composed of discrete analytic agents. The agents may apply fusion algorithms, detect a particular type of pattern, trend, change, and/or make decisions about executing a pre-defined course of action. An analyst centric user interface allows for agents to be configured directly using intuitive graphical widgets that map existing forensic methods of analysis into a real-time domain. A large base of analytic agents may form part of a baseline for the ABI Multi-INT analytics platform, as shown in Table 5.

TABLE 5

Exemplary Analytic Agents for Use in ABI Multi-INT analytics platform

| Agent | Description |
|---|---|
| Change | Detection of new events and activities, or the cessation of events and activities |
| Correlation | Spatial-Temporal correlation of observable or activity events |
| Frequency | Detection of multiple unique occurrences of a specific type of event or activity |
| Envelope | Generates dynamic AOI around last X occurrences of an observable |
| Moving AOI | Generates dynamic circular AOI around a given entity |
| Network | Detection of social or operational links between events, activities, and locations |
| Profile | Spatial correlation of event to Area of Interest created by user or other agent |
| Context | Correlation of events to fixed context: political boundaries, water/land, urban/rural |
| Target | Correlation of events to fixed targets or facilities |
| Trend | Detection of deviation from current or historical trends (moving averages). Includes establishment of new high water/low water marks, inflection points, inside/outside range of normalcy |
| Multi-Trend | Cross-correlation of trends of different activity at the same or different locations |
| Sequence | Detection of a specific sequences of events or activities |
| Movement | Detection of significant movement changes to include start/stop, direction reversal, acceleration/deceleration |
| Track Correlation | Correlation of two or more derived track geometries |
| Cyclical | Detection of deviations from cyclical norms—time of day, day/night, calendar day, calendar month, season, . . . |
| Sentiment | Agent to call a possibly external service to detect positive/negative sentiment and intensity |
| Entity Resolution | Resolution of unique entities from multiple sources via co-location and common attributes (semantic co-reference) |
| Sentiment | Agent to call a possibly external service to detect positive/negative sentiment and intensity |

The math tool 720, as described in U.S. application Ser. No. 14/185,029 and mentioned above regarding FIGS. 5 and 7, may be a center piece of the analytical assessment framework 710 shown in FIG. 7. A primary purpose of the math tool 720 may be to represent a probability that a combination of non-kinetic and kinetic effects will be able to negate the threat posed by one or more threats against one or more friendly targets. For example, missiles launched against a friendly vehicle or structure. The math tool 720 may support strategic and tactical planning endeavors, as well as guide decisions related to the deployment of both non-kinetic and kinetic weapons.

As mentioned above, the math tool may include 4 computational layers: a basic factors level 1410 (shown in FIG. 13), a temporal level, a validation level, and/or a terminal phase level. The basic factors level, which may be computational level 1, may calculate a Pnegation (Pn) for each Vulnerability and Technique (VT) Pair (Initial Data Input Level). The temporal level, which may be computational level 2, may calculate a Pn(VT) that is conditioned on Time (Ti) and Pn(VTTi) may be calculated for each VT Pair. The validation level, which may be computational level 3, Pn(VTTi) value may be conditioned based on additional factors, most of which may be related to validation: probability of validation of deployment (Pvd), probability of activation (Pa), and probability of validation of activation (Pva). The terminal phase level, which may be computational level 4, may have a Pn that is calculated by computing the conditional a priori probabilities for the Pn values related to each of the previous four AMD Layers 330 (FIG. 3).

Referring to FIG. 13, the basic factors level 1410 is exemplified as a matrix which may be used to calculate a probability that a specific vulnerability of a threat 1412 can be negated via the use of a selection of kinetic 1420 and non-kinetic 1422 techniques. The threat 1412 may be characterized as a scenario in which one or more missiles intended to destroy a friendly target are launched from a specific location within an adversary's sphere of influence. For example, a specific threat may be the launch of a multi-missile attack launched by an enemy nation located hundreds of miles from the friendly target, and the friendly target may be naval vessels.

The X axis of the matrix in FIG. 13 displays a plurality of vulnerabilities 1430 that may have been identified during the vulnerability phase 324 (FIGS. 3 and 7). The vulnerabilities may relate to the operations, equipment, and facilities of the enemy threat (e.g., a missile). The vulnerabilities 1430 may include weaknesses that occur within, and/or are introduced into, the missile life-cycle 810 (FIG. 8). The vulnerabilities may occur or be introduced during the manufacture phase 331, deployment phase 332 (e.g., fielding and deployment layer), boost phase 333 (e.g., missile launch), and midcourse phase 334 and/or terminal phase 335 (e.g., missile flight)

The vulnerabilities 1430 may be exploited through techniques 1440 identified during the techniques phase 323 (FIGS. 3 and 7). These techniques may prevent successful operation of the enemy missile. Each of the AMD layers 330 corresponding to the missile may be divided into sub-categories that provide more detail regarding the types of vulnerabilities 1430 that might be exploited. For example, one of the subcategories of deployment layer 332 may be facility 1442, which incorporates vulnerabilities related to missile support and missile launch facilities which may be part of a missile deployment complex (not shown). The deployment layer 332 may also include a vehicle 1444 and maintenance 1446 sub-category. The maintenance 1446 sub-category may include a tools 1448 and personnel 1450 further sub-category.

A subcategory related to the launch layer 333 may include a communications 1452 and a command and control, supervisory control and data acquisition 1454 (C2/SCADA) sub-category. The communications 1452 sub-category may incorporate vulnerabilities related to potential disruption of communication channels used to facilitate missile launch. The C2/SCADA 1454 sub-category may incorporate vulnerabilities related to disruption of the technologies which convey launch commands and other missile control information.

The Y axis displays the techniques 1440 identified during the techniques phase 323 that may be used to exploit the vulnerabilities 1430 and cause a partial or complete failure of the enemy missile threat, thus preventing a successful missile attack. These techniques may be categorized as either non-kinetic 1422, directed energy 1460, or kinetic 1420. The term non-kinetic includes techniques that are generally referred to as "cyber weapons" (e.g., techniques that are used to disrupt or destroy hardware and/or software components of a computerized system or network). An example of a non-kinetic technique would be a Trojan horse or worm that would be inserted into a computer system and exploit a known software vulnerability to cause the degradation of a missile control system.

Directed energy 1460 techniques include such things as a targeted electromagnetic pulse (EMP), which can disrupt electronic transmissions and communications signals.

The cells of the matrix may contain the Pn probabilities related to the effectiveness of a specific technique 1430 in exploiting a specific vulnerability 1440.

Results of the math tool 720 may be fed into the existing discrete event simulation tool 722 to derive quantitative results for specific AMD scenarios oriented towards the AMD layers 330 (FIG. 3). The discrete event simulation tool 722 may include: ExtendSim. The discrete event simulation tool 722 may also share information with other applications and simulators 740 including those for OSINT, manufacturing, cyber, kinetic missile defense, battle management and ISR. These applications and simulators may include: a RAYTHEON® Missile Defense (RMD) tool, an advanced modeling and simulation environment (AMSE), a cyber analysis modeling evaluation for operations (CAMEO), and/or a Cyber Suppressor.

The RMDtool may provide an effective modeling, simulation, and analysis (MS&A) capability to support a wide variety of missile defense studies. The RMDtool is based on proven capabilities to provide an analysis approach that balances output accuracy with model fidelity to achieve an effective overall analysis capability for both one-on-one and raid scenarios.

The RMDtool is based on proven legacy tools that have supported a broad spectrum of missile and air defense engineering studies. Missile modeling was developed from an evolution of integrated air defense simulation (ITADS) and missile trim aero kinematic simulation (MTrAKS). Radar modeling was developed from an evolution of CRUSHM and MDAT. EO/IR sensor modeling was based on deployed sensors for satellites and both manned and unmanned airborne systems. Communications modeling is based on the proven distributed communications effect module (DCEM). These legacy tools have a demonstrated pedigree across a broad customer base.

The C2BMC 326 (FIG. 6) may provide a flexible methodology to demonstrate the baseline implementation as well as to explore variations to maximize system performance.

A flexible M&S framework may be used to allow for the rapid integration of new capabilities. In addition, a standard set of mathematical utilities may be included to facilitate a broader range of systems analyses. Integration of these capabilities into a unified analytic and forward based simulation tool provides a unique system-of-systems analysis capability for missile defense. The RMDtool may provide insight into interdependencies among systems elements of the threat, thereby providing a comprehensive understanding of overall missile defense system performance.

Analysis output may include measures of engagement success, causes of engagement failures (e.g., timeline constraint violations, kinematic deficiencies, etc.), defended areas, denied launch areas, operating areas, and/or raid size capacity. Data output from the RMDtool may be easily transferred into Excel® or Matlab® for further data analysis and the RMDtool output can be provided as an input to Vis to provide a visualization of scenario playbacks.

The AMSE is a robust multi-purpose, event-driven simulation and modeling tool kit with emphasis on user control and flexibility. The AMSE may be utilized for battle-space modeling of land, air, sea and space assets and threats. The AMSE may also provide an end-to-end analysis capability from element through system and system-of-systems (SoS) interoperability, including all aspects of modeling for battle management command, control, communications, computers and intelligence (BMC4I) applications. In addition, the AMSE may also model terrain and environmental factors and their respective influence on the target architecture.

The AMSE uses an object-based approach that enables emphasis to be focused on user specific areas of interest. Users define the BMC4I logic using AMSE's integral rule set logic language. This logic uses perceived data versus truth data to provide real-world accuracy in modeling at all levels. AMSE users can construct test or operational scenarios, experiments, and exercises using a master library of existing system models. AMSE also allows the user to build customized models via AMSE's enhanced graphical user interface (GUI). Execution of an AMSE experiment involves independent operations of multiple SSRs in the scenario of interest over a specified time period.

Measures of Effectiveness (MOE) and measure of performance (MOP) may be readily provided to users. During execution, raw analysis data may be collected that can be filtered and formatted into graphical or tabular outputs using the embedded suite of analysis and reporting tools.

CAMEO is a premier cyber modeling and simulation (M&S) product. CAMEO allows users to model the vulnerabilities, threats, attacks, and countermeasures within these environments. CAMEO users can build models and run simulations which support the identification and prioritization of cyber vulnerabilities, which provide recommendations of methods to mitigate these vulnerabilities, which illustrate the effectiveness of different approaches to dynamic defense of their systems, and which support the development of tactics, techniques, and procedures to defend their networks. The CAMEO toolset may include sophisticated mathematical models based on a comprehensive set of cyber metrics, as well as visualization elements which support efficient model creation and intuitive simulations.

Cyber Suppressor may include modeling the effect of cyber attacks on air defense command and control (ADC2) systems using the existing SUPPRESSOR tools, using an OPNET network modeling product to extend SUPPRESSOR's representations of cyber networks, and integrating real-time cyber attack information into the extended SUPPRESSOR modeling capability.

ExtendSim may first derive a discrete event model of the Non-Kinetic Missile negation probabilities utilizing the data from the math tool 720 and the event simulation and visualization tool 722, and then to visualize the Pn results from these tools. This approach may include an autonomous capability to the convert the results from the probability models into dynamic executable models within the event simulation and visualization tool 722. This streamlined approach allows "what if" evaluations of specified scenario alternatives. ExtendSim may provide a flexible, rapid prototyping, discrete event based simulation environment to assess newly emerging available data, new requirements, architecture, and design impacts on performance and mission.

Additionally, the ExtendSim modeling and simulation environment enhances the development of the AMD system architecture that may be used to drive product development by ensuring that the basic structure and behavior of the system, the system interfaces, and system limitations and constraints are well understood The above description refers to a series of analytical processes that may be performed manually or automatically by a computer. In an embodiment, an analytical assessment framework may perform one or more of the above steps automatically and compute results for each performed step. For example, the analytical assessment framework may operate on a computer system to process each step. Alternatively, portions of the analytical assessment framework may operate on separate computers within a computer network comprising a plurality of computers operably connected to one another to process one or more portions of the above steps with the separate computers.

The above embodiments disclose steps that may be incorporated as instructions on a computer. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable instructions or executable instructions can be located in one logic or distributed between two or more communicating, co-operating, or parallel processing logics and thus can be loaded or executed in series, parallel, massively parallel and other manners.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of responding to a threat object, the method comprising:
    a method for selecting a response tool comprising:
        detecting with a sensor a phase and an identification of a threat object based on a detected portion of the threat object and/or a second object operatively connectable with the portion of the threat object;
        determining a model of a lifecycle of the threat object based on the detected portion and/or the second object;
        searching for a first set of vulnerabilities of the modeled lifecycle;
        choosing a first response tool to impair the performance of the threat object and the detected portion of the threat object and/or the second object; and
        storing the identification of the threat object, the model of the lifecycle, and the first response tool;
    a method for iteratively selecting a response tool during a first phase comprising:
        performing the method for selecting the response tool; and
        updating the identification of the threat object, the modeled lifecycle, the first set of vulnerabilities, and the first response tool based on the modeled lifecycle, vulnerabilities, the first response tool, and the first phase; and
    a method for iteratively selecting a response tool during a second phase comprising:
        detecting with the sensor a second phase;
        performing the method for selecting the response tool; and
        updating the identification of the threat object, the modeled lifecycle, the first set of vulnerabilities, and the first response tool based on the modeled lifecycle, vulnerabilities, the first response tool, and the second phase; and
    implementing the first response tool against the threat object and/or the second object.

2. The method of responding to a threat object of claim 1, further comprising:
    validating that the implemented first response tool deployed against the threat object and/or the second object.

3. The method of responding to a threat object of claim 2, further comprising:
    verifying that the validated first response tool mitigated the threat object and/or the second object.

4. The method of responding to a threat object of claim 1, wherein the method is repeated to update the stored identification of the threat object, the model of the lifecycle, and/or the first response tool, in response to identifying less than a first amount of vulnerabilities during the searching for a first set of vulnerabilities step.

5. The method of responding to a threat object of claim 4, wherein the first amount is one.

6. The method of responding to a threat object of claim 1, further comprising:
    searching for a first set of viable response tools for implementing against one or more of the vulnerabilities of the first set of vulnerabilities.

7. The method of responding to a threat object of claim 6, wherein the method is repeated to update stored identification of the threat object, the model of the lifecycle, and/or the first response tool, in response to identifying less than a first amount of viable response tools during the searching for a first set of viable response tools step.

8. The method of responding to a threat object of claim 7, wherein the first amount is one.

9. The method of responding to a threat object of claim 1, wherein the first response tool is chosen from a plurality of response tools provided in a database.

10. The method of responding to a threat object of claim 1, wherein the choosing a first response tool step comprises: choosing plurality of response tools.

11. The method of responding to a threat object of claim 1, wherein the method is repeated to update the stored identification of the threat object, the model of the lifecycle, and/or the first response tool, in response to determining that the first response tool was not implemented.

12. The method of responding to a threat object of claim 1, wherein the method is repeated to update the stored identification of the threat object, the model of the lifecycle, and/or the first response tool, in response to determining that the first response tool was mitigated.

13. The method of responding to a threat object of claim 1, wherein the threat object includes a kinetic weapon.

14. The method of responding to a threat object of claim 1, wherein the threat object includes a plurality of kinetic weapons.

15. The method of responding to a threat object of claim 1, wherein the threat object includes a vehicle.

16. The method of responding to a threat object of claim 1, wherein the first response tool includes a non-kinetic response tool.

17. The method of responding to a threat object of claim 1, wherein the first response tool includes a plurality of tools.

18. The method of responding to a threat object of claim 1, wherein the first response tool includes a kinetic tool.

19. The method of responding to a threat object of claim 1 further comprising:
determining a number of kinetic response tools that are required to negate the threat object based on an effectiveness of the first response tool.

20. A system for responding to a threat object, the system comprising:
a selector module for selecting a response tool, comprising:
a detection module with a sensor for detecting a phase and an identification of a threat object based on a detected portion of the threat object and/or a second object operatively connectable with the portion of the threat object;
a determination module for determining a model of a lifecycle of the threat object based on the detected portion and/or the second object;
a search module for searching a first set of vulnerabilities of the modeled lifecycle;
a choice module for choosing a first response tool to impair the performance of the threat object and the detected portion of the threat object and/or the second object; and
a storage module for storing the identification of the threat object, the model of the lifecycle, and the first response tool;
an iterative selection module for iteratively selecting a response tool during a first phase comprising:
a feedback loop for communication with the selector module for selecting the response tool; and
an update module for updating in the storage module the identification of the threat object, the modeled lifecycle, the first set of vulnerabilities, and the first response tool based on the modeled lifecycle, vulnerabilities, the first response tool, and the first phase; and
an iterative selection module for iteratively selecting a response tool during a second phase comprising:
a detection module for detecting with the sensor a second phase;
a feedback loop for communication with the selector module for selecting the response tool; and
an update module for updating in the storage module the identification of the threat object, the modeled lifecycle, the first set of vulnerabilities, and the first response tool based on the modeled lifecycle, vulnerabilities, the first response tool, and the second phase; and
an implementation module for implementing the first response tool against the threat object and/or the second object.

* * * * *